US012546682B2

(12) United States Patent
Chen et al.

(10) Patent No.: US 12,546,682 B2
(45) Date of Patent: Feb. 10, 2026

(54) OPTICAL SIGNAL DETECTION APPARATUS AND METHOD AND RELATED DEVICE

(71) Applicant: HUAWEI TECHNOLOGIES CO., LTD., Shenzhen (CN)

(72) Inventors: Fei Chen, Wuhan (CN); Ming Li, Shenzhen (CN); Chunyang Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 18/176,638

(22) Filed: Mar. 1, 2023

(65) Prior Publication Data

US 2023/0213408 A1 Jul. 6, 2023

Related U.S. Application Data

(63) Continuation of application No. PCT/CN2021/114053, filed on Aug. 23, 2021.

(30) Foreign Application Priority Data

Sep. 3, 2020 (CN) .......................... 202010917024.9

(51) Int. Cl.
G01M 11/00 (2006.01)
(52) U.S. Cl.
CPC .............. G01M 11/3145 (2013.01)
(58) Field of Classification Search
CPC ................................................ G01M 11/3145
See application file for complete search history.

(56) References Cited

U.S. PATENT DOCUMENTS 4,958,926 A * 9/1990 Bu-Abbud .......... H01S 5/06835
356/73.1
10,135,531 B1 * 11/2018 Joffe ...................... H04B 10/60
(Continued)

FOREIGN PATENT DOCUMENTS

CN 1681227 A * 10/2005
EP 0466087 A2 * 1/1992 ........ G01M 11/3145
(Continued)

*Primary Examiner* — Lisa M Caputo
*Assistant Examiner* — Nyla Gavia
(74) *Attorney, Agent, or Firm* — Maier & Maier, PLLC

(57) ABSTRACT

An optical signal detection apparatus. The apparatus includes an optical-to-electrical conversion module, a control module, a gain adjustment module, and an analog-to-digital conversion module. The optical-to-electrical conversion module is configured to receive an optical signal, and convert a received optical signal into an electrical signal; the control module is configured to obtain a first gain value corresponding to a first detection time period, the first detection time period is a detection time period in the detection cycle, different detection time periods in the detection cycle correspond to different gain values, and the first gain value is used for controlling the gain adjustment module to adjust an amplitude of the electrical signal; and the analog-to-digital conversion module is configured to perform sampling on an adjusted electrical signal, where the adjusted electrical signal is in a sampling range of the analog-to-digital conversion module.

17 Claims, 9 Drawing Sheets

(56) References Cited

U.S. PATENT DOCUMENTS

2012/0033201 A1* 2/2012 Fujiwara ............... G01M 11/08
356/73.1
2016/0233956 A1 8/2016 Kang et al.
2020/0272795 A1* 8/2020 Kenney .................. G06J 1/005

FOREIGN PATENT DOCUMENTS

| JP | H06109799 A | * | 4/1994 | |
|----|-------------|---|--------|----------|
| JP | H077211 A | * | 1/1995 | ........... H03G 3/3084 |

* cited by examiner

OPTICAL SIGNAL DETECTION APPARATUS AND METHOD AND RELATED DEVICE

CROSS-REFERENCE TO RELATED APPLICATIONS

This application is a continuation of International Application No. PCT/CN2021/114053, filed on Aug. 23, 2021, which claims priority to Chinese Patent Application No. 202010917024.9, filed on Sep. 3, 2020. The disclosures of the aforementioned applications are hereby incorporated by reference in their entireties.

TECHNICAL FIELD

The embodiments relate to the field of optical communication, an optical signal detection apparatus and method, and a related device.

BACKGROUND

An optical time domain reflectometer (OTDR) is an important instrument in the field of optical fiber measurement technologies, and is widely applied in detection, maintenance, and construction of an optical cable line, to implement functions such as measuring a length of an optical fiber, measuring a loss of an optical fiber splice, and locating a fault point of the optical fiber. When the OTDR is operating, the OTDR may send optical signals to a measured optical fiber, and phenomena such as Fresnel reflection and Rayleigh scattering may occur on the optical signals in the measured optical fiber, so that a part of the optical signals are reflected back to the OTDR. The OTDR processes the returned optical signals to obtain data that can reflect a measured index inside the measured optical fiber.

A dynamic range of the OTDR may reflect a longest distance measured by the OTDR. A larger dynamic range indicates a better curve shape in a measurement result and a longer measurable distance. The larger dynamic range of the OTDR also indicates that the OTDR may process an optical signal returned from a position with a larger difference in distance. The OTDR may include an optical signal detection apparatus, configured to detect and process a returned optical signal. Currently, the optical signal detection apparatus in the OTDR has a limited capability of sampling a signal, which leads to low measurement accuracy and a small actual dynamic range of the OTDR.

SUMMARY

The embodiments may provide an optical signal detection apparatus and method and a related device. Integrity of signal sampling in a process of processing a received optical signal may be improved, thereby improving measurement accuracy of an optical fiber measurement device and an actual dynamic range of the optical fiber measurement device.

A first aspect may provide an optical signal detection apparatus. The apparatus may be configured to process an optical signal detected in a detection cycle of the optical signal, and the apparatus includes an optical-to-electrical conversion module, a control module, a gain adjustment module, and an analog-to-digital conversion module. The functional modules or units may be independently deployed, or some functional modules or units may be integrated together. In an optional manner, each module or function may be partially or completely integrated into a chip.

The optical-to-electrical conversion module is configured to receive an optical signal, and convert a received optical signal into an electrical signal; the control module is configured to obtain a first gain value corresponding to a first detection time period, the first detection time period is a detection time period in a detection cycle, different detection time periods in the detection cycle correspond to different gain values, and the first gain value is used for controlling the gain adjustment module to adjust an amplitude of the electrical signal; and the analog-to-digital conversion module is configured to perform sampling on an adjusted electrical signal, where the adjusted electrical signal is in a sampling range of the analog-to-digital conversion module.

The detection cycle of the optical signal includes at least two different detection time periods, and different detection time periods correspond to different gain values. An optical signal returned from a near end of a measured optical fiber and an optical signal returned from a distal end of the measured optical fiber may be received in different detection time periods. Therefore, for an electrical signal obtained by being converted from the optical signal returned from the near end of the measured optical fiber, and an electrical signal obtained by being converted from the optical signal returned from the distal end of the measured optical fiber, the gain adjustment module may perform amplitude adjustment by using different gain values, so that the adjusted electrical signal is in the sampling range of the analog-to-digital conversion module, thereby ensuring integrity of electrical signal sampling, and improving the measurement accuracy of the optical fiber measurement device and the actual dynamic range of the optical fiber measurement device.

With reference to the first aspect, in an optional manner, the electrical signal converted by the optical-to-electrical conversion module is a current signal, and the gain adjustment module may include a first voltage conversion unit and a voltage attenuation unit; the first voltage conversion unit is configured to convert the current signal into a voltage signal; and the voltage attenuation unit is configured to attenuate, based on the first gain value, the voltage signal obtained through conversion.

Further, optionally, the gain adjustment module further includes a first amplification unit. The first amplification unit is configured to perform linear amplification on an attenuated voltage signal and send a linearly amplified voltage signal to the analog-to-digital conversion module.

With reference to the first aspect, in another optional manner, the electrical signal converted by the optical-to-electrical conversion module is a current signal, and the gain adjustment module includes a current attenuation unit and a second voltage conversion unit; the current attenuation unit is configured to attenuate the current signal based on the first gain value; and the second voltage conversion unit is configured to convert an attenuated current signal into a voltage signal.

In the optional manner, in an alternative implementation, the voltage signal converted by the second voltage conversion unit is in a sampling range of the analog-to-digital conversion module, and is configured to be transmitted to the analog-to-digital conversion module for sampling. In another alternative implementation, the gain adjustment module further includes a second amplification unit, configured to perform linear amplification on the voltage signal obtained through conversion, send a linearly amplified voltage signal to the analog-to-digital conversion module, and an amplified voltage signal is in the sampling range of the analog-to-digital conversion module.

With reference to the first aspect, in another optional manner, the electrical signal converted by the optical-to-electrical conversion module is a current signal, the gain adjustment module includes a third voltage conversion unit, and the third voltage conversion unit is configured to convert the current signal into a voltage signal based on the first gain value.

In the optional manner, in an alternative implementation, the voltage signal converted by the second voltage conversion unit is in a sampling range of the analog-to-digital conversion module, and is configured to be transmitted to the analog-to-digital conversion module for sampling. In another alternative implementation, the gain adjustment module further includes a second amplification unit, configured to perform linear amplification on the voltage signal obtained through conversion, send a linearly amplified voltage signal to the analog-to-digital conversion module, and an amplified voltage signal is in the sampling range of the analog-to-digital conversion module.

With reference to the first aspect, in another optional manner, the electrical signal converted by the optical-to-electrical conversion module is a current signal, and the gain adjustment module includes a fourth voltage conversion unit and a third amplification unit; the fourth voltage conversion unit is configured to convert the current signal into a voltage signal; and the third amplification unit is configured to perform linear amplification on the voltage signal obtained through conversion based on the first gain value, and send a linearly amplified voltage signal to the analog-to-digital conversion module.

With reference to the first aspect, in another optional manner, the control module is further configured to perform, based on a first compensation value, digital compensation on a digital signal obtained by the analog-to-digital conversion module through sampling, where the first compensation value is determined based on the first gain value. Through the digital compensation performed by the control module, electrical signals adjusted by using different gain values in each detection time period may be restored to electrical signals adjusted by using a unified gain value, thereby ensuring continuity of a curve in which a strength of an optical signal changes with a distance, and further improving accuracy and readability of the curve information.

With reference to the first aspect, in still another optional manner, a gain value corresponding to the detection time period is determined based on one or two of a maximum value and a minimum value of strengths of optical signals received in the detection time period and the sampling range of the analog-to-digital conversion module.

A second aspect may provide an optical signal detection method, for processing an optical signal detected in a detection cycle of the optical signal. The method is applied to an optical signal detection apparatus, and the optical signal detection apparatus includes an optical-to-electrical conversion module, an analog-to-digital conversion module, a gain adjustment module, and a control module; and the optical-to-electrical conversion module is configured to receive an optical signal, and convert the optical signal into an electrical signal.

In the method, the control module obtains a first gain value corresponding to a first detection time period, where the first detection time period is a detection time period in the detection cycle, different detection time periods in the detection cycle correspond to different gain values, the first gain value is used for controlling the gain adjustment module to adjust an amplitude of the electrical signal, an adjusted electrical signal is used by the analog-to-digital conversion module for sampling, and the adjusted electrical signal is in a sampling range of the analog-to-digital conversion module.

The detection cycle of the optical signal includes at least two different detection time periods, and different detection time periods correspond to different gain values. An optical signal returned from a near end of a measured optical fiber and an optical signal returned from a distal end of the measured optical fiber may be received in different detection time periods. Therefore, for an electrical signal obtained by being converted from the optical signal returned from the near end of the measured optical fiber, and an electrical signal obtained by being converted from the optical signal returned from the distal end of the measured optical fiber, the control module may control the gain adjustment module to perform amplitude adjustment by using different gain values, so that the adjusted electrical signal is in the sampling range of the analog-to-digital conversion module, thereby ensuring integrity of electrical signal sampling, and improving measurement accuracy of an optical fiber measurement device and an actual dynamic range of the optical fiber measurement device.

With reference to the second aspect, in an optional manner, the control module may further perform, based on a first compensation value, digital compensation on a digital signal obtained by the analog-to-digital conversion module through sampling, where the first compensation value is determined based on the first gain value. Through the digital compensation performed by the control module, electrical signals adjusted by using different gain values in each detection time period may be restored to electrical signals adjusted by using a unified gain value, thereby ensuring continuity of a curve in which a strength of an optical signal changes with a distance, and further improving accuracy and readability of the curve information.

With reference to the second aspect, in another optional manner, a gain value corresponding to the detection time period is determined based on one or two of a maximum value and a minimum value of strengths of optical signals received in the detection time period and the sampling range of the analog-to-digital conversion module.

A third aspect may provide another optical signal detection apparatus, configured to process an optical signal detected in a detection cycle of the optical signal, and the apparatus includes an optical-to-electrical conversion module, a control module, and an electrical signal processing module.

The optical-to-electrical conversion module is configured to receive an optical signal; the control module is configured to obtain a first gain value corresponding to a first detection time period, the first detection time period is a detection time period in a detection cycle, different detection time periods in the detection cycle correspond to different gain values, and the first gain value is used for controlling the optical-to-electrical conversion module to adjust a strength of a received optical signal; the optical-to-electrical conversion module is further configured to convert an adjusted optical signal into an electrical signal; the electrical signal processing module is configured to perform sampling on a converted electrical signal, where the electrical signal converted by the optical-to-electrical conversion module is in a sampling range of the electrical signal processing module; or the electrical signal processing module is configured to perform amplification on the converted electrical signal, and perform sampling on an amplified electrical signal, where the electrical signal amplified by the electrical signal processing module is in the sampling range of the electrical signal processing module.

The detection cycle of the optical signal includes at least two different detection time periods, and different detection time periods correspond to different gain values. An optical signal returned from a near end of a measured optical fiber and an optical signal returned from a distal end of the measured optical fiber may be received in different detection time periods. The optical-to-electrical conversion module may be configured to adjust a strength of an optical signal by using different gain values for optical signals received in different detection time periods, so that the electrical signal obtained by being converted from an adjusted optical signal, when transmitted to the analog-to-digital conversion module, is in the sampling range of the analog-to-digital conversion module, thereby ensuring integrity of signal sampling, and improving measurement accuracy of an optical fiber measurement device and an actual dynamic range of the optical fiber measurement device.

A fourth aspect may provide an optical signal detection apparatus. The optical signal detection apparatus may include a processor, a memory, and a receiver. The processor, the memory, and the receiver are connected to each other. The receiver is configured to receive a signal (for example, receive an optical signal), the memory is configured to store a program, and the processor is configured to invoke the program stored in the memory. When the program is executed by a computer, the optical signal detection method in the second aspect is implemented.

A fifth aspect may provide an optical fiber measurement device. The optical fiber measurement device includes an optical signal detection apparatus, an emitting apparatus, a transmission apparatus, and a control apparatus, where the control apparatus is configured to trigger the emitting apparatus to emit an optical signal based on input configuration information; the transmission apparatus is configured to transmit the optical signal emitted by the emitting apparatus to a measured optical fiber, and is further configured to transmit the optical signal received from the measured optical fiber to the optical signal detection apparatus; the optical signal detection apparatus is the optical signal detection apparatus according to any one of the first aspect or the third aspect; and the control apparatus is further configured to perform digital signal processing on a signal output by the optical signal detection apparatus, and output a result obtained by performing the digital signal processing.

A sixth aspect may provide a non-transitory computer-readable medium, where the non-transitory computer-readable medium stores a program, and when the program runs on a computer, the computer is enabled to perform the optical signal detection method in the second aspect.

A seventh aspect may provide a chip, where the chip includes a processor and a communication interface. The processor is coupled to the communication interface, and is configured to implement all or some functions of the optical signal detection apparatus in the first aspect or any one of the optional implementations, or implement all or some functions of the optical signal detection apparatus in the third aspect.

BRIEF DESCRIPTION OF THE DRAWINGS

To describe embodiments more clearly, the following briefly describes the accompanying drawings. It is clear that the accompanying drawings in the following description show merely some of the embodiments and a person of ordinary skill in the art may derive other drawings from these accompanying drawings without creative efforts.

DETAILED DESCRIPTION OF THE EMBODIMENTS

The following describes the embodiments with reference to the accompanying drawings. It is clear that the described embodiments are some, but not all, of the embodiments. All other embodiments obtained by a person of ordinary skill in the art without creative efforts shall fall within the scope of the embodiments described herein.

Figure 1:
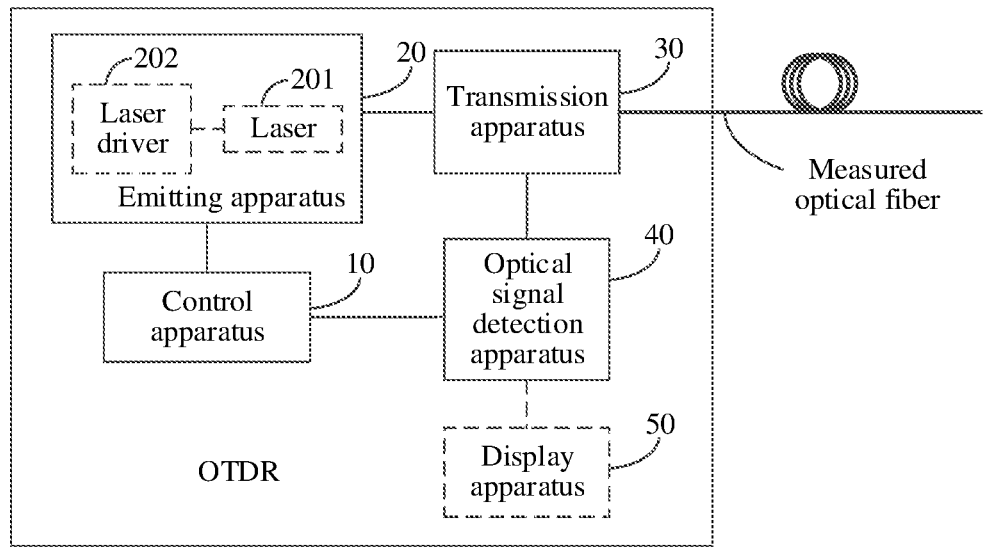
FIG. 1 is a schematic diagram of a structure of an OTDR according to an embodiment.

Before an optical signal detection apparatus is described, internal implementation of an OTDR is first described with reference to FIG. 1 and FIG. 2. First, FIG. 1 is a schematic diagram of a structure of an OTDR according to an embodiment. As shown in FIG. 1, the OTDR includes a control apparatus 10, an emitting apparatus 20, a transmission apparatus 30, and an optical signal detection apparatus 40.

The control apparatus 10 is configured to drive the emitting apparatus 20 to emit optical signals based on a received configuration parameter, and the transmission apparatus 30 is configured to transmit the optical signals emitted by the emitting apparatus 20 to a measured optical fiber; and Fresnel reflection and Rayleigh scattering occur on the optical signals in the measured optical fiber, and a part of the optical signals are returned to the OTDR. The transmission apparatus 30 is further configured to receive the optical signals returned from the measured optical fiber, and transmit the optical signals received from the measured optical fiber to the optical signal detection apparatus 40. The optical signal detection apparatus 40 is configured to detect the optical signals, and process detected optical signals into digital signals. The control apparatus 10 may be further configured to perform digital signal processing on digital signals output by the optical signal detection apparatus 40, and output a result obtained by performing the digital signal processing.

Optionally, as shown in FIG. 1, the OTDR may further include a display apparatus 50. The display apparatus 50 may be configured to receive the result of digital signal processing output by the control apparatus 10, and display the result of the digital signal processing. In another implementation, the control apparatus 10 may output the result of digital signal processing to another device or apparatus, and display or perform other processing on the result of digital signal processing through the another device or apparatus.

Optionally, the control apparatus 10 may include a processor. The processor may be a central processing unit (CPU), a digital signal processor (DSP), an application-specific integrated circuit (ASIC), or the like. In this way, the processor may process the received configuration parameter, to drive the emitting apparatus 20 to emit an optical signal, or the processor performs digital signal processing on the signal output by the optical signal detection apparatus 40.

The configuration parameter received by the control apparatus 10 may be a configuration parameter input by a user. For example, the configuration parameter may include a parameter such as a wavelength of the optical signal emitted by the emitting apparatus 20, a pulse width of the optical signal, a power strength of the optical signal, a measurement range of the OTDR (which may indicate a maximum length that is currently measured), or the like.

Digital signal processing performed by the control apparatus 10 on the digital signal output by the optical signal detection apparatus 40 may include performing normalization processing on the digital signal. For example, normalization processing may be performed on the digital signal through an optical power of an optical signal received by the optical signal detection apparatus 40 at an initial moment of a detection cycle. When the signal output by the optical signal detection apparatus 40 is a voltage digital signal, the control apparatus 10 may determine a corresponding electrical power based on the voltage digital signal, then determine a relative value (the relative value is in a unit of dB) between the electrical power and the optical power, and the relative value is used as a result of normalization processing. For another example, normalization processing may be performed on the digital signal through the voltage signal converted from the optical signal received by the optical signal detection apparatus 40 at the initial moment of the detection cycle. If the signal output by the optical signal detection apparatus 40 is the voltage digital signal, the control apparatus 10 may calculate a relative value (the relative value is in a unit of dB) between an amplitude of the voltage digital signal output by the optical signal detection apparatus 40 and an amplitude of the voltage signal converted from the optical signal received at the initial moment of the detection cycle, and the relative value is used as a result of normalization processing. Digital signal processing may further include performing digital domain noise reduction processing on the digital signal, or the like.

Optionally, the emitting apparatus 20 may include a laser 201 and a laser driver 202. The laser 201 may be a laser diode (LD), configured to emit an optical signal with high coherence. The laser driver 202 may be configured to provide a proper bias current and a modulation current for the LD, so that the bias current is slightly greater than a threshold current of the LD, and the LD operates in a linear region, thereby stably emitting an optical signal.

Optionally, the transmission apparatus 30 may include an optical circulator. The optical circulator is a multi-port and non-reciprocity optical device. When light is input from a port of the optical circulator, the light may only be output from a specified port with a low loss. However, a loss from the input port to another port is very large, and a non-connected port is formed, so that an optical signal emitted from the emitting apparatus 20 may be transmitted to a measured optical fiber, and the optical signal returned from the measured optical fiber is transmitted to the optical signal detection apparatus 40.

Optionally, the optical signal detection apparatus 40 may be configured to receive an optical signal, convert the optical signal into an electrical signal, and may further be configured to perform amplification and sampling on the electrical signal. A sampled digital signal may represent a strength change situation of an optical signal received by the OTDR at different moments.

The optical signal detection apparatus 40 may include an optical-to-electrical conversion module, an electrical signal amplification module, and an analog-to-digital conversion module. In a process of processing a received optical signal, the optical signal detection apparatus 40 first converts the received optical signal into an electrical signal through the optical-to-electrical conversion module. The electrical signal obtained by being directly converted from the optical signal is weak, and needs to be amplified by the electrical signal amplification module before being identified and sampled by the analog-to-digital conversion module.

In the optical signal detection apparatus 40, an amplification gain of the electrical signal amplification module may be fixed. That is, electrical signals obtained by being converted from optical signals received at any moment are all amplified by using the same amplification gain value. For example, FIG. 2 is a schematic diagram of a structure of an optical signal detection apparatus in an OTDR according to an embodiment. As shown in FIG. 2, an optical signal detection apparatus 40 includes an optical detection module 401, a trans-impedance amplification module 402, a linear amplification module 403, and an analog-to-digital conversion module 404.

The optical detection module 401 is configured to receive an optical signal, and convert a received optical signal into a current signal; the trans-impedance amplification module 402 is configured to convert the current signal obtained by the optical detection module 401 into a voltage signal; the linear amplification module 403 is configured to perform linear amplification on the voltage signal obtained by the trans-impedance amplification module 402; and the analog-to-digital conversion module 404 is configured to perform sampling on the voltage signal amplified by the linear amplification module 403.

Figure 2:
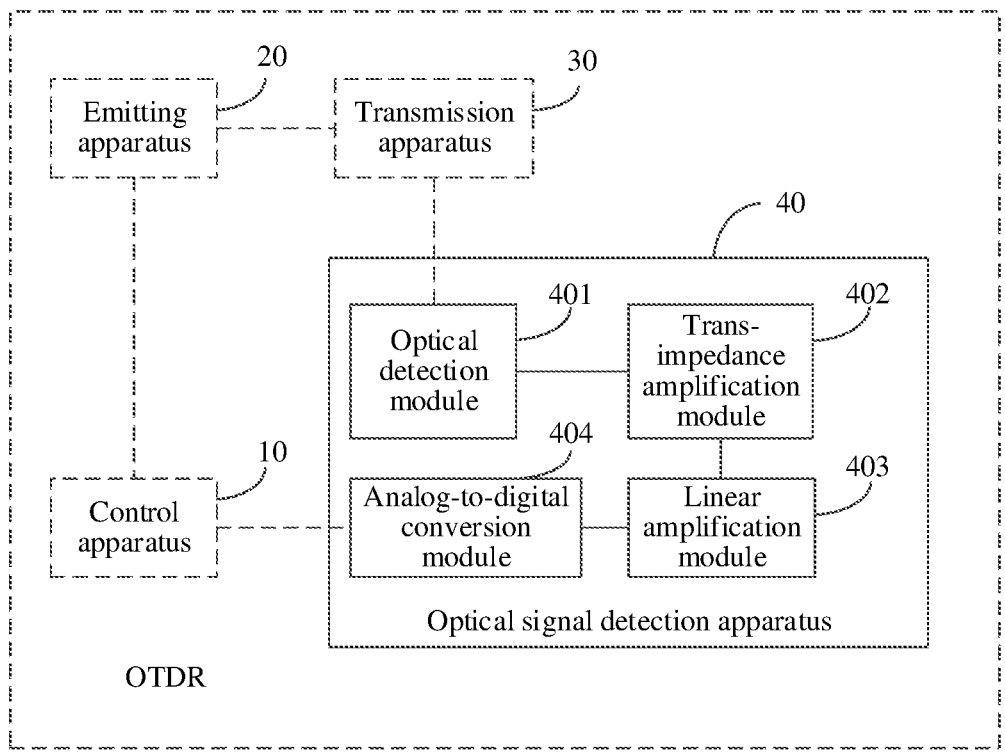
FIG. 2 is a schematic diagram of a structure of an optical signal detection apparatus in an OTDR according to an embodiment.

It should be understood that the electrical signal amplification module of the optical signal detection apparatus 40 in FIG. 2 includes the trans-impedance amplification module 402 and the linear amplification module 403. In a process in which an electrical signal is transmitted in the optical signal detection apparatus 40 in FIG. 2, the electrical signal may be amplified in the trans-impedance amplification module 402 and the linear amplification module 403. In a process of converting a current signal into a voltage signal, the trans-impedance amplification module 402 amplifies the electrical signal through a resistor with a fixed resistance value. Because the resistance value is fixed, a signal amplification gain of the trans-impedance amplification module 402 is fixed. In addition, the linear amplification module 403 may use a voltage amplifier with a fixed gain. Therefore, an overall amplification gain of the optical signal detection apparatus 40 of the structure is fixed.

The overall amplification gain of the optical signal detection apparatus 40 is fixed. That is, when processing an optical signal received at any moment, the optical signal detection apparatus 40 performs linear amplification based on the fixed gain. Because a strength of an optical signal returned from a near end of a measured optical fiber differs greatly from a strength of an optical signal returned from a distal end of the measured optical fiber, a strength of an electrical signal (denoted as a near-end electrical signal for ease of description) obtained by being converted from the optical signal returned from the near end of the measured optical fiber differs greatly from a strength of an electrical signal (denoted as a distal-end electrical signal for ease of description) obtained by being converted from the optical signal returned from the distal end of the measured optical fiber. Therefore, if the electrical signal amplification module performs linear amplification on the near-end electrical signal and the distal-end electrical signal based on the same amplification gain, an amplified near-end electrical signal may exceed a maximum electrical signal that can be identified by the analog-to-digital conversion module, and/or an amplified distal electrical signal may still be lower than a minimum electrical signal that can be identified by the analog-to-digital conversion module. Both the two possible cases cause loss of measurement information of the measured optical fiber by the OTDR, thereby reducing test accuracy of the OTDR, and reducing an actual dynamic range of the OTDR.

For example, for an OTDR whose dynamic range is 40 dB, an avalanche photodiode detector (APD) may be used as an optical detector and is configured to receive an optical signal and convert the optical signal into a current signal. If a pulse peak power of a laser diode is 20 dBm, a responsivity of the APD under a bias voltage is 10 mA/mW, and an amplitude range of a current signal obtained by being converted from a received optical signal by the APD is about 1 pA to 1 uA. That is, a ratio of a maximum current to a minimum current is about $10^6$ times. After being amplified by the trans-impedance amplification module and the linear amplification module with a fixed amplification gain, the ratio of the maximum voltage to the minimum voltage input into the analog-to-digital conversion module is still about $10^6$ times. A sampling range (that is, a sampling range, or an identifiable range, which may indicate a minimum voltage signal and/or a maximum voltage signal for sampling) of the analog-to-digital conversion module may be 0.5 mV to 500 mV, a ratio of a minimum identifiable voltage to a maximum identifiable voltage is $10^3$ times, and the sampling range of the analog-to-digital conversion module is less than a range of an input voltage. If a voltage signal converted from a current signal of 1 pA is amplified to the sampling range of the analog-to-digital conversion module, a voltage signal converted from a current signal of 1 uA after being amplified is greater than a maximum sampling voltage of the analog-to-digital conversion module. If the voltage signal converted from the current signal of 1 uA is amplified to the sampling range of the analog-to-digital conversion module, the voltage signal converted from the current signal of 1 pA after being amplified is less than a minimum sampling voltage of the analog-to-digital conversion module. Therefore, in the two cases, voltage signals input into the analog-to-digital conversion module cannot be completely identified, and some voltage signals are lost.

In an application scenario, as the optical signal detection apparatus 40 continuously receives and processes an optical signal, the OTDR may obtain a time-varying situation of the electrical signal obtained by being converted from the optical signal. In the optical signal detection apparatus 40, a strength of the optical signal is in a linear relationship with an amplitude of the electrical signal. Therefore, the time-varying situation of the electrical signal may also reflect a time-varying situation of the optical signal. A transmission rate of the optical signal in the optical fiber is fixed. Therefore, a time for receiving the optical signal corresponds to a transmission distance of the optical signal. A distance-varying situation of the strength of the optical signal may be obtained based on the time-varying situation of the optical signal.

Based on a feature of continuous attenuation of the optical signal in a transmission process of the measured optical fiber, it is not difficult to obtain that in the transmission process of the optical signal in the measured optical fiber, a strength of the optical signal at a position closer to the OTDR is greater, and a strength of the optical signal at a position farther to the OTDR is less. A change of the strength of the optical signal with a change of a distance may be represented as a straight line that gradually decreases with an increase of the distance. However, in an actual measurement process, because the measured optical fiber is affected by some factors, a loss caused by the measured optical fiber on the optical signal may not even. For example, there is a joint between the OTDR and the measured optical fiber, which may cause strong reflection on the optical signal. For another example, it is possible that there is a splicing point or a joint in the measured optical fiber, which may cause strong scattering or reflection on the optical signal. For another example, a bent part may appear due to damage on the measured optical fiber during use, which may cause strong scattering, reflection, or even transmission on the optical signal. Therefore, in the actual measurement process, a curve in which a strength of an optical signal changes with a distance may not be a regular straight line. But on the whole, it should be represented that an optical signal at a position at a short distance is strong, and an optical signal at a position at a long distance is weak.

Figure 3:
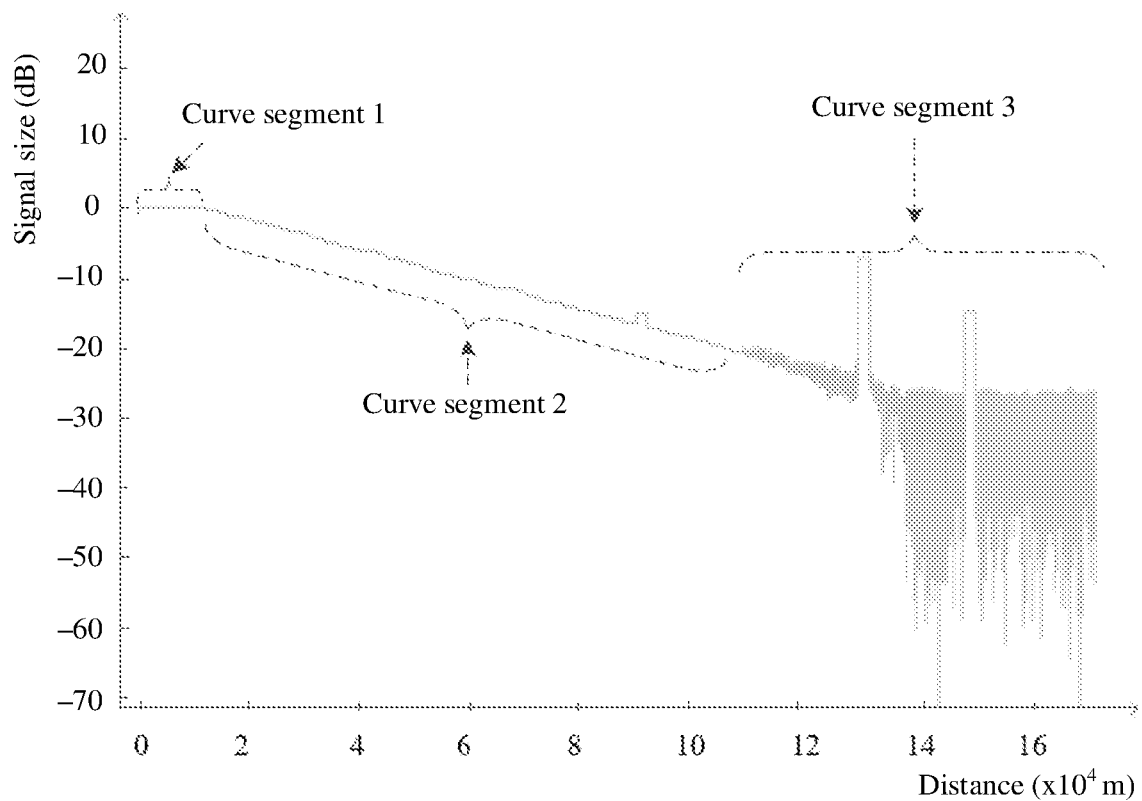
FIG. 3 is a schematic diagram of a detection result of an OTDR according to an embodiment.

However, if the optical signal detection apparatus 40 amplifies a signal by using a fixed amplification gain, a sampling range in which the analog-to-digital conversion module performs sampling on an electrical signal may be smaller than an amplitude range of an electrical signal amplified by the electrical signal amplification module. In this case, sampling on the near-end electrical signal performed by the analog-to-digital conversion module may be saturated, and is represented as a horizontal line segment in a curve. Sampling on the distal-end electrical signal may not be identified, and is prematurely represented as a sawtooth-shaped curve segment that frequently and abruptly changes in the curve. For example, FIG. 3 is a schematic diagram of a detection result of an OTDR according to an embodiment. In a coordinate system shown in FIG. 3, a gray solid line represents a signal change curve obtained by measurement, and the curve is analyzed from a near end to a distal end. As shown in FIG. 3, because a near-end electrical signal is strong, an electrical signal at a short distance is represented as a horizontal line segment (a curve segment 1 in FIG. 3). When the electrical signal decreases to a sampling range of an analog-to-digital conversion module as a distance increases, the analog-to-digital conversion module may perform normal electrical signal sampling, so that a curve is represented as gradually decreasing as the distance increases (as shown in a curve segment 2 in FIG. 3). When the distance increases, the electrical signal decreases to a signal below a minimum electrical signal that can be identified by the analog-to-digital conversion module, and the analog-to-digital conversion module cannot normally identify the electrical signal and perform sampling, so that the curve is prematurely represented as an invalid sawtooth-shaped curve segment that frequently and abruptly changes (as shown in a curve segment 3 in FIG. 3). Therefore, the optical signal detection apparatus with a fixed amplification gain causes loss of some electrical signals, and affects measurement accuracy of the OTDR and an actual dynamic range of the OTDR.

The optical signal detection apparatus provided in embodiments may be applied to an optical fiber measurement device (for example, the OTDR or another optical fiber sensor) that measures an optical signal in an optical fiber. The optical fiber measurement device such as the OTDR is used as an example for description. The optical signal detection apparatus is configured to process an optical signal detected in a detection cycle of an optical signal, and may ensure sampling integrity of an electrical signal in a processing process, thereby improving measurement accuracy of the optical fiber measurement device and an actual dynamic range of the optical fiber measurement device. Before the optical signal detection apparatus is described, a detection cycle of an optical signal is first described.

The detection cycle of the optical signal is a time for the optical signal detection apparatus to measure a measured optical fiber once. In the detection cycle of the optical signal, as time passes by, an optical signal received by the optical signal detection apparatus may be used as an optical signal that is gradually returned from a near end of the measured optical fiber to a distal end of the measured optical fiber. That is, at an initial moment of the detection cycle, the OTDR starts to receive and process an optical signal at a position at a nearest end, and at a last moment of the detection cycle, the OTDR receives and processes an optical signal at a position set at a most distal end. There are a plurality of manners of determining the detection cycle of the optical signal, and several determining manners are described by using examples.

In a first optional manner, the detection cycle of the optical signal may be a time interval between two pulses emitted by an emitting apparatus in the OTDR. For example, the emitting apparatus starts to emit a first pulse at a moment t1, and starts to emit a second pulse at a moment t2. A time difference between the moment t2 and the moment t1 is the detection cycle of the optical signal.

In a second optional manner, the detection cycle of the optical signal may be a sampling cycle set for the analog-to-digital conversion module in the OTDR. The analog-to-digital conversion module performs sampling at a sampling frequency in the sampling cycle. For example, the analog-to-digital conversion module is set to perform sampling at a sampling frequency of 10 M times/second within 1.7 ms, and 1.7 ms is a detection cycle of the optical signal.

In a third optional manner, the detection cycle of the optical signal may be a detection time of the optical signal for a pulse emitted by the emitting apparatus in the OTDR. For a pulse, if a detection cycle of an optical signal corresponding to the pulse ends, the optical signal detection apparatus detects an optical signal for a next pulse of the pulse, or the optical signal detection apparatus stops detecting the optical signal.

In a fourth optional implementation, the detection cycle of the optical signal may be determined based on a measurement range of the OTDR. The measurement range may indicate a currently measured maximum length. The detection cycle of the optical signal may be determined based on the maximum length and a propagation speed of the optical signal in the optical fiber. For example, the maximum length indicated by the measurement range is 170 km, and the propagation speed of the optical signal in the optical fiber is $2 \times 10^8$ m/s. A duration occupied for transmitting the optical signal to the maximum length and returning the optical signal may be used as the detection cycle of the optical signal, that is, a detection cycle $T=170 \times 10 \times 2/(2 \times 10^8)=1.7$ ms.

It should be understood that in a scenario in which the OTDR tests an optical loss of the optical fiber, a test result includes a curve in which a strength of an optical signal changes with a distance. The currently measured maximum length indicated by the measurement range of the OTDR may be set to a value greater than an actual length of the measured optical fiber. For example, the maximum length indicated by the measurement range of the OTDR may be set to 1.5 times to 2 times the actual length of the measured optical fiber. In this way, an actual loss of the optical signal in the measured optical fiber may be clearly and completely represented through a curve.

With reference to FIG. 4 to FIG. 15, an optical signal detection apparatus provided in the embodiments is described below.

Figure 4:
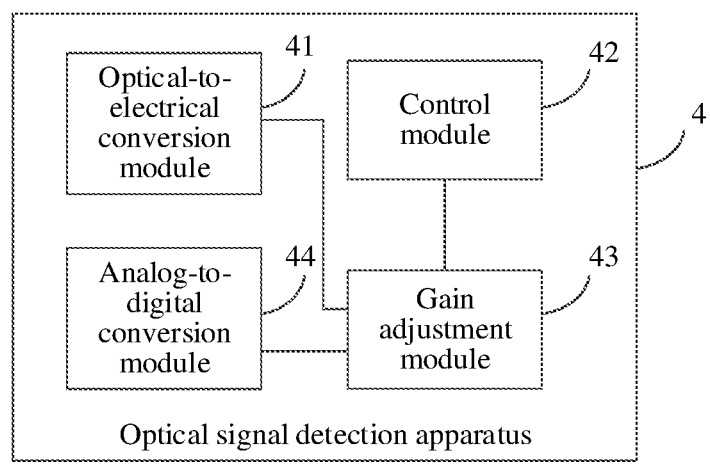
FIG. 4 is a schematic diagram of a structure of an optical signal detection apparatus according to an embodiment.

FIG. 4 is a schematic diagram of a structure of an optical signal detection apparatus according to an embodiment. As shown in FIG. 4, the optical signal detection apparatus 4 may include an optical-to-electrical conversion module 41, a control module 42, a gain adjustment module 43, and an analog-to-digital conversion module 44.

The optical-to-electrical conversion module 41 is configured to receive an optical signal, and convert the optical signal into an electrical signal;

the control module 42 is configured to obtain a first gain value corresponding to a first detection time period, the first detection time period is a detection time period in a detection cycle, different detection time periods in the detection cycle correspond to different gain values, and the first gain value is used for controlling the gain adjustment module 43 to adjust an amplitude of the electrical signal; and the analog-to-digital conversion module 44 is configured to perform sampling on an adjusted electrical signal, where the adjusted electrical signal is in a sampling range of the analog-to-digital conversion module 44.

The detection cycle of the optical signal includes at least two different detection time periods, and different detection time periods correspond to different gain values. An optical signal returned from a near end of a measured optical fiber and an optical signal returned from a distal end of the measured optical fiber may be received in different detection time periods. Therefore, for an electrical signal obtained by being converted from the optical signal returned from the near end of the measured optical fiber, and an electrical signal obtained by being converted from the optical signal returned from the distal end of the measured optical fiber, the gain adjustment module 43 may perform amplitude adjustment by using different gain values, so that the adjusted electrical signal is in the sampling range of the analog-to-digital conversion module, thereby ensuring integrity of electrical signal sampling, and improving measurement accuracy of an OTDR and an actual dynamic range of the OTDR.

First, a detection time period in the detection cycle of the optical signal and a gain value corresponding to the detection time period are described.

The detection cycle of the optical signal may include at least two detection time periods, and the detection time period may be any duration less than a duration of the detection cycle. For example, if the detection cycle is at a millisecond (ms) level, a duration of the detection time period may be at a millisecond level, a microsecond (μs) level, a nanosecond (ns) level, a picosecond (ps) level, a femtosecond (fs) level, or the like. The detection time period may be divided in a plurality of manners. In any one of the division manners, an initial moment of the detection cycle and a last moment of the detection cycle may be divided into different detection time periods. In this way, amplitude adjustment may be performed on the electrical signal based on different gain values, so that an amplitude of an electrical signal converted from a part or all of optical signals received at an initial stage of the detection cycle is adjusted to a sampling range of the analog-to-digital conversion module 44, and/or so that an amplitude of an electrical signal converted from a part or all of optical signals received at an end stage of the detection cycle is adjusted to the sampling range of the analog-to-digital conversion module 44, thereby improving integrity of electrical signal collection. Division manners of three alternative detection time periods may be described below.

In an alternative implementation, the detection time period may be divided based on a measurement result of the OTDR with a fixed gain on the measured optical fiber, and a capability (the capability may be represented by a sampling range of the analog-to-digital conversion module 44) of the analog-to-digital conversion module 44 to detect an electrical signal.

In the measurement result of the OTDR with the fixed gain on the measured optical fiber, there is a curve segment that can effectively reflect a change rule of the optical signal, and the effective curve segment may be close to a straight line segment that gradually decreases as a distance increases. For example, in a measurement result in FIG. 3, an effective curve segment (for example, a curve segment 2 in FIG. 3) is located between a horizontal line segment (for example, a curve segment 1 in FIG. 3) and a sawtooth-shaped curve segment (for example, a curve segment 3 in FIG. 3) that frequently and abruptly changes. Further, based on a slope of the straight line segment close to the effective curve segment, an amplitude change rule of the electrical signal transmitted to the analog-to-digital conversion module 44 in the entire detection cycle may be determined, and a detection time period may be divided for the detection cycle, so that a maximum amplitude and a minimum amplitude of the electrical signal transmitted to the analog-to-digital conversion module 44 in each detection time period may be adjusted to the sampling range of the analog-to-digital conversion module 44 based on a same linear adjustment coefficient.

From a perspective of a curve of the detection result of the OTDR, because the sampling range of the analog-to-digital conversion module 44 may be represented by the curve (the curve may be represented as an effective curve segment that gradually decreases as time increases, and corresponds to a signal in the sampling range of the analog-to-digital conversion module 44) of the detection result of the OTDR, that is, points in a coordinate system of the detection result respectively corresponding to the maximum amplitude and the minimum amplitude of the electrical signal transmitted to the analog-to-digital conversion module 44 in a same detection time period may, in a same movement direction and movement distance, translate upward or downward to a range of a value of a vertical coordinate (that is, a value of a signal size) corresponding to the valid curve segment in a coordinate system of a curve of the measurement result. Optionally, in a same detection time period, a difference between the maximum amplitude and the minimum amplitude of the electrical signal transmitted to the analog-to-digital conversion module 44 may be 5 dB to 30 dB.

In another alternative implementation, the detection time period may be divided based on an optical loss parameter of the measured optical fiber and the sampling range of the analog-to-digital conversion module 44. The optical loss parameter of the measured optical fiber may indicate a loss of the optical signal in a measured optical fiber of a unit length. Therefore, a duration of each detection time period is determined based on the optical loss parameter, a transmission speed of the optical signal in the measured optical fiber, and the sampling range of the analog-to-digital conversion module 44, and the detection time period of the detection cycle is divided based on a duration of the determined detection time period.

For example, the loss (in a unit of dB/km) of the optical signal in the measured optical fiber in a unit length is multiplied by the transmission speed (in a unit of km/s) of the optical signal in the measured optical fiber, to obtain a loss (in a unit of dB/s) of the optical signal in the measured optical fiber in a unit time. Then, a relative value (in a unit of dB) between the maximum value and the minimum value in the sampling range is determined based on the sampling range of the analog-to-digital conversion module, and therefore, a ratio of the relative value to the loss in the measured optical fiber in the unit time of the optical signal is determined, and any value greater than zero and less than or equal to the ratio is determined as a preset duration of the detection time period. In this way, starting from a start moment of the detection cycle, a time period of each preset duration is divided into one detection time period. If there is a remaining time period less than the preset duration in the detection cycle, the time period less than the preset duration may be determined as one detection time period.

In still another alternative implementation, a detection time period may be divided for a measurement result of the measured optical fiber based on the OTDR with the fixed gain. For example, a time period corresponding to a horizontal line segment in a curve of the detection result is divided into one detection time period, a time period corresponding to an effective curve segment that is as a whole represented as gradually decreasing as a distance increases is divided into one detection time period, and a time period corresponding to a sawtooth-shaped curve segment that frequently and abruptly changes is divided into one detection time period.

For example, in FIG. 3, a detection cycle corresponding to a measurement result in FIG. 3 is 1.7 ms, a curve of a signal size corresponding to a distance ranging from 0 km to 20 km includes a horizontal line segment, and a detection time corresponding to the distance ranging from 0 km to 20 km in the detection cycle may be divided into a same detection time period (that is, 0 ms to 0.2 ms). A curve of a signal size corresponding to a distance ranging from 20 km to 100 km may be represented as an effective curve segment that decreases with an increase of a distance, and may effectively represent a change rule of a signal size. A detection time corresponding to the distance ranging from 20 km to 100 km in the detection cycle may be divided into the same detection time period (that is, 0.2 ms to 1 ms). A curve of a signal size corresponding to a distance after 100 km includes an invalid sawtooth-shaped curve segment that frequently and abruptly changes changing from a valid curve segment, and a detection time corresponding to the distance after 100 km in the detection cycle is divided into a same detection time period (that is, 1 ms to 1.7 ms).

It should be understood that the detection cycle includes a plurality of detection time periods, and a first detection time period may be any one of the detection time periods. In other words, at any moment in the detection cycle, the control module 42 may determine a detection time period at which the moment is located, and use the time period as the first detection time period, to implement a function of obtaining a first gain value corresponding to the first detection time period.

A gain value corresponding to each detection time period may be represented in a plurality of forms, and a form is not limited. If the gain value corresponding to the detection time period is in a unit of dB, the gain value corresponding to the detection time period may be any positive value, any negative value, or zero. If the gain value corresponding to the detection time period is in a form of a multiple, the gain value corresponding to the detection time period may be any positive number. It should be understood that if the gain value is in a unit of dB, a positive gain value and a negative gain value may be respectively used for representing amplification or attenuation of an amplitude of the electrical signal; or a positive gain value may be used for representing an action object of the gain value. For example, the action object of the gain value may be a variable electrical attenuator (VEA), and the positive gain value is used for representing an amplitude adjustment capability of the variable electrical attenuator for the electrical signal. A greater gain value represents that the amplitude of the electrical signal may be attenuated to a smaller amplitude.

The gain value corresponding to each detection time period may be determined based on one or two of a maximum value and a minimum value of strengths of optical signals received in the detection time period and the sampling range of the analog-to-digital conversion module 44. For example, for any detection time period in the detection cycle, it is assumed that the maximum value of the strength of the received optical signal in the detection time period is $P_{max}$, the minimum value of the strength of the received optical signal in the detection time period is $P_{min}$, and the sampling range of the analog-to-digital conversion module 44 is ($A_{min}$, $A_{max}$), and it is assumed that the first gain value is used for controlling a first component in the gain adjustment module to adjust the amplitude of the electrical signal, if a total gain value obtained by adjusting an amplitude of an optical signal or an electrical signal converted from an optical signal by another component except the first component in the optical signal detection apparatus 4 is G, a first gain value T meets the following condition: $P_{min}+G+T \geq A_{min}$, and/or $P_{max}+G+T \leq A_{max}$. In the condition, units of the strength of the optical signal ($P_{max}$ and $P_{min}$), the sampling range ($A_{min}$ and $A_{max}$), the first gain value (T), and the total gain value (G) are all dB. Because $P_{min}$ and/or $P_{max}$ of different detection time periods may be different, first gain values corresponding to different detection time periods may be different.

The optical signal detection apparatus 4 and function implementation of each module are described below.

Optionally, the optical signal detection apparatus 4 may further include a filtering module (not shown in FIG. 4). In an optional manner, the filtering module may be connected between the gain adjustment module 43 and the analog-to-digital conversion module 44 and is configured to perform analog filtering on an electrical signal adjusted by the gain adjustment module 43, to eliminate electrical noise in the electrical signal, or the like.

Optionally, the optical signal detection apparatus 4 may further include a timing module (not shown in FIG. 4). The timing module may be connected to the control module 42, and is configured to perform timing, and transmit timing information to the control module 42. The timing information is configured by the control module 42 to determine a detection time period in a detection cycle. The timing module may be implemented by a hardware timing module, or may be implemented by a software timing module.

Optionally, the optical-to-electrical conversion module 41 includes an optical detector (also referred to as an optical detector, or the like). The optical detector is configured to convert a received optical signal into a current signal based on an optical-to-electrical effect, and the current signal obtained through conversion is output by the optical-to-electrical conversion module 41, or the current signal obtained by being converted by the optical detector is converted into a voltage signal by the optical-to-electrical conversion module 41, and the voltage signal obtained through conversion is output.

Optionally, the control module 42 may include a processor. The processor may be one or a combination of multiple of a CPU, a DSP, and an ASIC, and the processor may be configured to obtain the first gain value corresponding to the first detection time period in the first detection time period, so that the first gain value may be used for controlling the gain adjustment module 43 to adjust the amplitude of the electrical signal. Functions of the control module 42 and functions of the control apparatus in the OTDR may be implemented through a same processor or a same group of processors, or may be implemented by using different processors. Alternatively, a processor that implements a part of functions of the control module 42 may also simultaneously implement a part of functions of the control apparatus of the OTDR.

Further, the control module 42 may be configured to obtain the first gain value corresponding to the first detection time period based on a correspondence between the detection time period and the gain value. In the correspondence between the detection time period and the gain value, the first gain value corresponds to the first detection time period.

Further, the correspondence between the detection time period and the gain value may be pre-stored in a memory. The memory may include a high-speed random access memory, and may also include a non-volatile memory, for example, one or more magnetic disk storage devices, flash storage devices, or other non-volatile solid-state storage devices. In an implementation, the memory may be a part of the control module 42. In another implementation, the memory may be a memory other than the control module 42, for example, may be a memory in the control apparatus in the OTDR; or for another example, the memory may be a memory in another device or a memory in an Internet cloud, so that the correspondence between the detection time period and the gain value may be obtained by the control module 42 from the memory in another device or the cloud through a communication interface of the OTDR.

Optionally, the analog-to-digital conversion module 44 includes an analog-to-digital converter (ADC). The analog-to-digital converter is configured to convert, through a process of sampling, holding, quantization, and encoding, a time-continuous and amplitude-continuous analog signal input into the analog-to-digital conversion module 44 into a time-discrete and amplitude-discrete digital signal, and transmit an obtained digital signal to the control apparatus of the OTDR to perform digital signal processing.

The first gain value is used for controlling the gain adjustment module 43 to adjust an amplitude of the first electrical signal. In an implementation, the first gain value may be transmitted by the control module 42 to the gain adjustment module 43, and then be used by the gain adjustment module 43 to adjust an amplitude of the electrical signal.

In another implementation, after the first gain value is determined, the control module 42 may be further configured to send indication information of the first gain value to the gain adjustment module 43, and the gain adjustment module 43 may be configured to obtain the first gain value based on the indication information of the first gain value to perform amplitude adjustment on the electrical signal. For example, the detection cycle includes two detection time periods: a detection time period 1 and a detection time period 2. The detection time period 1 corresponds to a gain value A, and the detection time period 2 corresponds to a gain value B. Indication information of the gain value A may be set to a low level, and indication information of the gain value B may be set to a high level. If the control module 42 obtains the corresponding gain value A in the detection time period 1, the control module 42 may transmit the low level to the gain adjustment module 43. If the control module 42 obtains the corresponding gain value B in the detection time period, the control module 42 may transmit the high level to the gain adjustment module 43, so that when detecting the low level, the gain adjustment module 43 may be configured to obtain the gain value A to perform amplitude adjustment on the electrical signal, and when detecting the high level, the gain adjustment module 43 may be configured to obtain the gain value B to perform amplitude adjustment on the electrical signal. Further, the gain adjustment module 43 may include a memory, configured to store a correspondence between the indication information and the gain value. The correspondence is configured by the gain adjustment module 43 to obtain the first gain value based on the indication information of the first gain value.

The gain adjustment module 43 may include different components and adjust the amplitude of the electrical signal based on the first gain value in different manners. Several alternative implementations of the gain adjustment module 43 are described with reference to FIG. 5 to FIG. 10 below by using examples.

In a first alternative implementation, the electrical signal converted by the optical-to-electrical conversion module 41 is a current signal, and the gain adjustment module 43 includes a first voltage conversion unit and a voltage attenuation unit. The first voltage conversion unit may be configured to convert the current signal obtained by being converted from the optical-to-electrical conversion module 41 into a voltage signal, and the voltage attenuation unit may be configured to attenuate the voltage signal obtained by being converted by the first voltage conversion unit based on the first gain value.

In an optional implementation of the first voltage conversion unit, the first voltage conversion unit may include a trans-impedance amplifier (TIA). The trans-impedance amplifier includes a resistor, which may be configured to convert a current signal into a voltage signal.

In an optional implementation of the voltage attenuation unit, the voltage attenuation unit may include a fast variable voltage attenuator. The fast variable voltage attenuator may be configured to quickly adjust an attenuation coefficient of the fast variable voltage attenuator based on the first gain value, and attenuate the voltage signal based on an adjusted attenuation coefficient.

Figure 5:
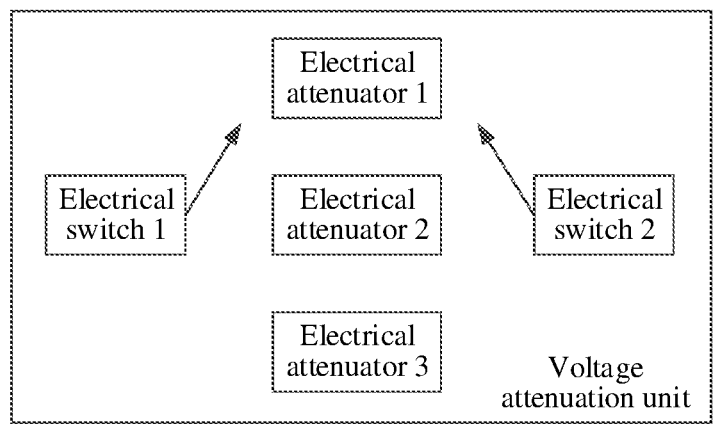
FIG. 5 is a schematic diagram of a structure of a voltage attenuation unit according to an embodiment.

In another optional implementation of the voltage attenuation unit, the voltage attenuation unit may be implemented by at least two electrical attenuators that have fixed attenuation capabilities for the voltage signal and have different attenuation capabilities for the voltage signal, and an electrical switch that controls whether the electrical attenuator is connected. Refer to an example in FIG. 5. FIG. 5 is a schematic diagram of a structure of a voltage attenuation unit according to an embodiment. The voltage attenuation unit shown in FIG. 5 includes an electrical attenuator 1, an electrical attenuator 2, and an electrical attenuator 3 that are connected in parallel. The three electrical attenuators are connected in parallel, and an electrical switch 1 and an electrical switch 2 are selectively connected to the three electrical attenuators, so that an electrical attenuator corresponding to the first gain value is connected to a circuit to attenuate an electrical signal.

Figure 6:
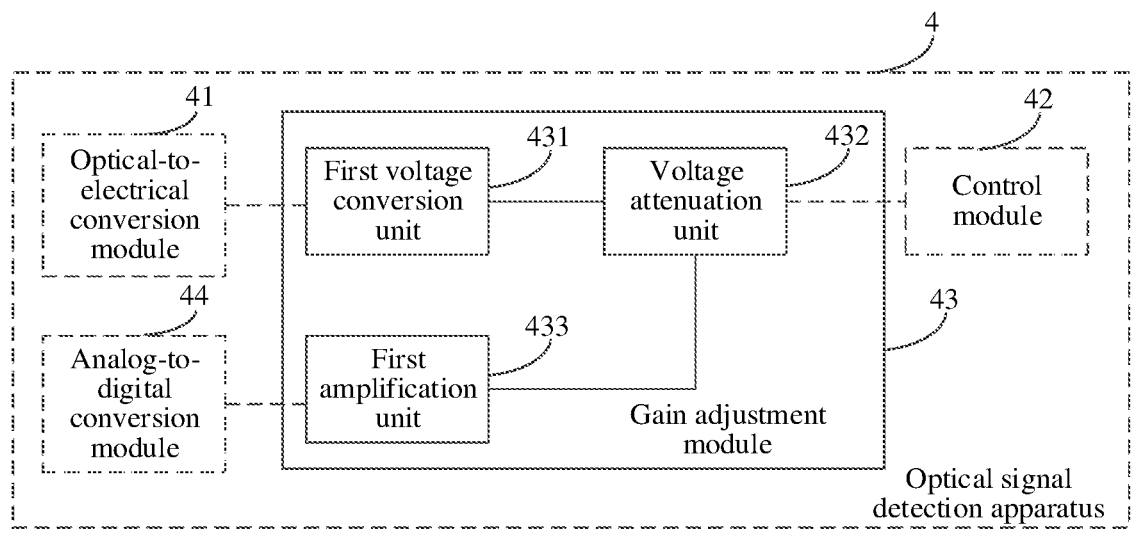
FIG. 6 is a schematic diagram of a structure of a gain adjustment module according to an embodiment.

Further, with respect to a signal attenuated by the voltage attenuation unit, in an optional manner, the voltage signal attenuated by the voltage attenuation unit is in a sampling range of the analog-to-digital conversion module 44, and an attenuated voltage may be transmitted to the analog-to-digital conversion module 44 for sampling. In another optional manner, the voltage signal attenuated by the voltage attenuation unit may be amplified to the sampling range of the analog-to-digital conversion module 44, and an amplified voltage signal is transmitted to the analog-to-digital conversion module 44 for sampling. For example, FIG. 6 is a schematic diagram of a structure of a gain adjustment module. For details, refer to FIG. 6 by using examples.

As shown in FIG. 6, the first voltage conversion unit 431 is configured to convert a current signal output by the analog-to-digital conversion module 44 into a voltage signal and transmit a converted voltage signal to the voltage attenuation unit 432. The voltage attenuation unit 432 may be connected to the control module 42, and is configured to receive a first gain value obtained by the control module 42, or receive indication information of the first gain value obtained by the control module 42. The voltage attenuation unit 432 is configured to attenuate a voltage signal obtained by being converted by the first voltage conversion unit 431 based on the first gain value. The first amplification unit 433 is connected to the voltage attenuation unit 432, and is configured to perform linear amplification on the voltage signal attenuated by the voltage attenuation unit 432. An amplified voltage signal is in the sampling range of the analog-to-digital conversion module 44, and may be transmitted to the analog-to-digital conversion module 44 for sampling. Optionally, the first amplification unit 433 may include a voltage linear amplifier, such as a low noise amplifier (LNA).

In a second alternative implementation, the electrical signal converted by the optical-to-electrical conversion module 41 is a current signal, and the gain adjustment module 43 includes a current attenuator and a second voltage conversion unit. The current attenuation unit may be configured to attenuate the current signal obtained by being converted by the optical-to-electrical conversion module 41 based on the first gain value, and the second voltage conversion unit may be configured to convert the current signal attenuated by the current attenuation unit into a voltage signal.

In an optional implementation of the current attenuation unit, the current attenuation unit may include a fast variable current attenuator. The fast variable current attenuator may be configured to quickly adjust an attenuation coefficient of the fast variable current attenuator based on the first gain value, and attenuate the current signal based on an adjusted attenuation coefficient.

In another optional implementation of the current attenuation unit, the current attenuator may be implemented by at least two electrical attenuators that have fixed attenuation capabilities for the current signal and have different attenuation capabilities for the current signal, and an electrical switch that controls whether the electrical attenuator is connected. An example may be similar to the example shown in FIG. 5 and details are not repeated.

In an optional implementation of the second voltage conversion unit, the second voltage conversion unit may include a trans-impedance amplifier. The trans-impedance amplifier includes a resistor, which may be configured to convert a current signal into a voltage signal.

Figure 7:
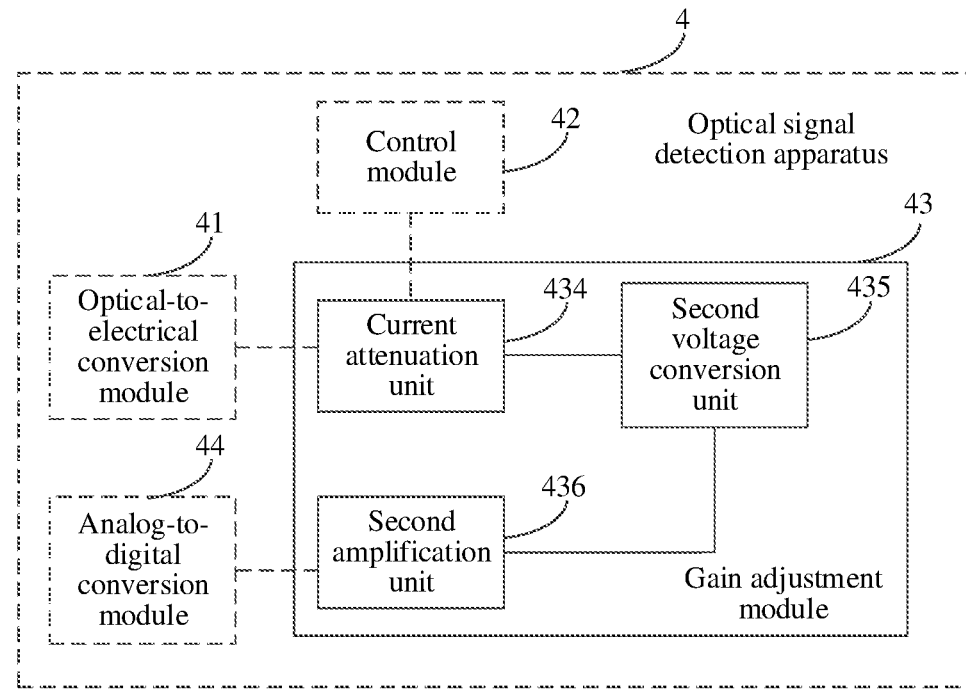
FIG. 7 is a schematic diagram of a structure of another gain adjustment module according to an embodiment.

Further, with respect to the voltage signal obtained by being converted by the second voltage conversion unit, in an optional manner, the voltage signal converted by the second voltage conversion unit is in a sampling range of the analog-to-digital conversion module 44, and a converted voltage signal may be transmitted to the analog-to-digital conversion module 44 for sampling. In another optional manner, the voltage signal converted by the second voltage conversion unit may be amplified to the sampling range of the analog-to-digital conversion module 44, and an amplified voltage signal is transmitted to the analog-to-digital conversion module 44 for sampling. For example, FIG. 7 is a schematic diagram of a structure of another gain adjustment module according to an embodiment. Refer to FIG. 7 for description.

As shown in FIG. 7, the current attenuation unit 434 may be connected to the control module 42 and is configured to receive a first gain value obtained by the control module 42, or receive indication information of the first gain value obtained by the control module 42. The current attenuation unit 434 is configured to attenuate a current signal output by the analog-to-digital conversion module 44 based on the first gain value, and transmit an attenuated current signal to the second voltage conversion unit 435. The second voltage conversion unit 435 may be configured to convert the current signal attenuated by the current attenuation unit 434 into a voltage signal. The second amplification unit 436 is connected to the second voltage conversion unit 435, and is configured to perform linear amplification on the voltage signal obtained by being converted by the second voltage conversion unit 435. An amplified voltage signal is in the sampling range of the analog-to-digital conversion module 44, and may be transmitted to the analog-to-digital conversion module 44 for sampling. Optionally, the second amplification unit 436 may include a voltage linear amplifier.

In a third alternative implementation, the electrical signal converted by the optical-to-electrical conversion module 41 is a current signal, the gain adjustment module 43 may include a third voltage conversion unit, and the third voltage conversion unit may be configured to convert the current signal obtained by the optical-to-electrical conversion module 41 into a voltage signal based on the first gain value.

In an optional implementation of the third voltage conversion unit, the third voltage conversion unit includes a trans-impedance amplifier with a variable resistance value. The trans-impedance amplifier with the variable resistance value may be configured to adjust an operating resistance of the trans-impedance amplifier based on the first gain value, and convert an input current signal into a voltage signal based on an adjusted operating resistance.

In another optional implementation of the third voltage conversion unit, the third voltage conversion unit may be implemented through at least two resistors with fixed resistance values and different resistance values, and a fast switching switch, for example, a fast silicon controllable switch. In this way, the resistors with different resistance values are selectively turned on by turning on or off the fast switching switch, to implement voltage conversion on the current signal by using a resistor access circuit corresponding to the first gain value.

Figure 8:
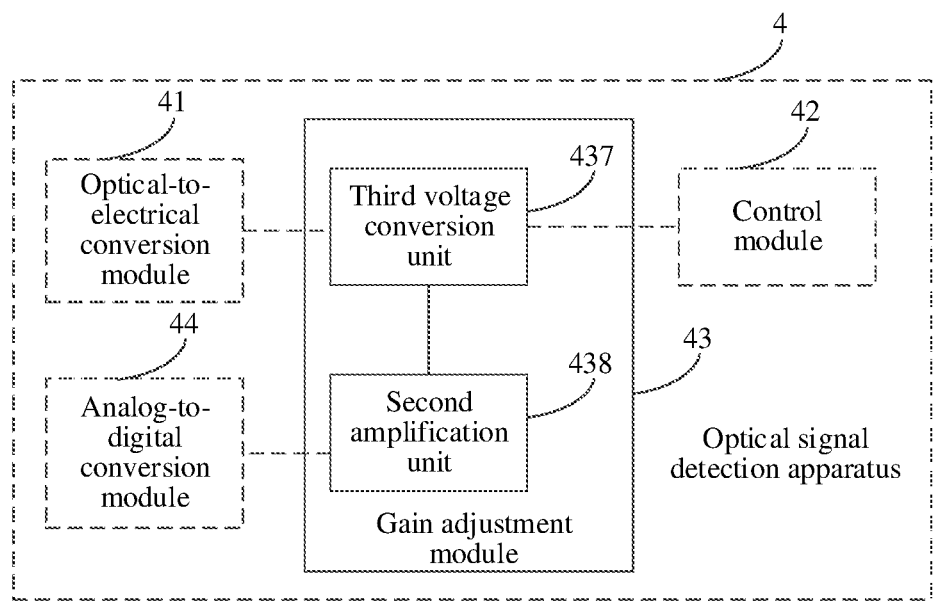
FIG. 8 is a schematic diagram of a structure of another gain adjustment module according to an embodiment.

Further, for the voltage signal converted by the third voltage conversion unit, in an optional manner, the voltage signal converted by the third voltage conversion unit is in a sampling range of the analog-to-digital conversion module, and a converted voltage signal may be transmitted to the analog-to-digital conversion module 44 for sampling. In another optional manner, the voltage signal converted by the third voltage conversion unit may be amplified to the sampling range of the analog-to-digital conversion module 44, and an amplified voltage signal is transmitted to the analog-to-digital conversion module 44 for sampling. For example, FIG. 8 is a schematic diagram of a structure of another gain adjustment module according to an embodiment. Refer to FIG. 8 for description.

As shown in FIG. 8, the third voltage conversion unit 437 may be connected to the control module 42 and is configured to receive a first gain value obtained by the control module 42 or receive indication information of the first gain value obtained by the control module 42. The third voltage conversion unit 437 may be configured to convert the current signal output by the analog-to-digital conversion module 44 into a voltage signal based on the first gain value. The second amplification unit 438 is connected to the third voltage conversion unit 437, and is configured to perform linear amplification on the voltage signal obtained by being converted by the third voltage conversion unit 437. An amplified voltage signal is in the sampling range of the analog-to-digital conversion module 44, and may be transmitted to the analog-to-digital conversion module 44 for sampling. The second amplification unit 438 may include a voltage linear amplifier.

In a fourth alternative implementation, the electrical signal converted by the optical-to-electrical conversion module 41 is a current signal, and the gain adjustment module 43 includes a fourth voltage conversion unit and a third amplification unit. The fourth voltage conversion unit is configured to convert the current signal obtained by being converted by the optical-to-electrical conversion unit into a voltage signal, and the third amplification unit is configured to perform linear amplification on the voltage signal obtained by being converted by the fourth voltage conversion unit based on the first gain value, and send a linearly amplified voltage signal to the analog-to-digital conversion module 44 for sampling.

In an optional implementation of the fourth voltage conversion unit, the fourth voltage conversion unit includes a trans-impedance amplifier. The trans-impedance amplifier includes a resistor, which may be configured to convert a current signal into a voltage signal.

In an optional implementation of the third amplification unit, the third amplification unit may include a linear amplifier with a variable amplification coefficient. The linear amplifier with the variable amplification coefficient may be configured to adjust an amplification coefficient of the linear amplifier based on the first gain value and perform linear amplification on the voltage signal obtained by being converted by the fourth voltage conversion unit based on the adjusted amplification coefficient. An amplified voltage signal is in the sampling range of the analog-to-digital conversion module 44, and may be transmitted to the analog-to-digital conversion module 44 for sampling.

It should be understood that in the first alternative implementation to the fourth alternative implementation, electrical signals transmitted to the analog-to-digital conversion module 44 are all voltage signals, and the analog-to-digital conversion module 44 may be configured to perform sampling on a received voltage signal. In still some optional manners, the analog-to-digital conversion module 44 may also be configured to perform sampling on a received current signal, and may input the current signal to the analog-to-digital conversion module 44 to perform sampling on the current signal. Descriptions are made below with reference to a fifth alternative implementation and a sixth alternative implementation.

In the fifth alternative implementation, the electrical signal converted by the optical-to-electrical conversion module 41 is a current signal, and the gain adjustment module 43 includes a fourth amplification unit. The fourth amplification unit is configured to perform linear amplification on the current signal converted by the optical-to-electrical conversion module 41 based on the first gain value, and send an amplified current signal to the analog-to-digital conversion module 44.

In an optional implementation of the fourth amplification unit, the fourth amplification unit includes a linear amplifier with a variable amplification coefficient, and the linear amplifier with the variable amplification coefficient is configured to adjust an amplification coefficient of the linear amplifier based on the first gain value, and perform linear amplification on the current signal obtained by being converted by the optical-to-electrical conversion module 41 based on an adjusted amplification coefficient.

Figure 9:
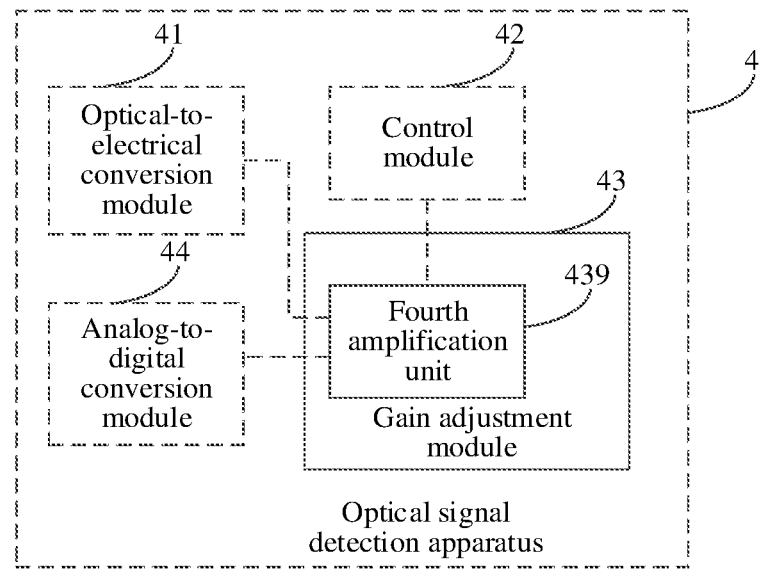
FIG. 9 is a schematic diagram of a structure of another gain adjustment module according to an embodiment.

For example, FIG. 9 is a schematic diagram of a structure of another gain adjustment module according to an embodiment. As shown in FIG. 9, the fourth amplification unit 439 may be connected to the control module 42, and is configured to receive a first gain value obtained by the control module 42, or receive indication information of the first gain value obtained by the control module 42. The fourth amplification unit 439 may be connected between the optical-to-electrical conversion module 41 and the analog-to-digital conversion module 44, and is configured to receive the current signal output by the optical-to-electrical conversion module 41, and output a linearly amplified current signal to the analog-to-digital conversion module 44.

In a sixth alternative implementation, the electrical signal converted by the optical-to-electrical conversion module 41 is a current signal, and the gain adjustment module includes a current attenuation unit and a fifth amplification unit. The current attenuation unit is configured to attenuate the current signal converted by the optical-to-electrical conversion module 41 based on the first gain value, and send an attenuated current signal to the fifth amplification unit. The fifth amplification unit is configured to perform linear amplification on the current signal attenuated by the current attenuation unit, and transmit an amplified current signal to the analog-to-digital conversion module 44.

In an optional implementation of the current attenuation unit, the current attenuation unit may include a fast variable current attenuator. The fast variable current attenuator may be configured to quickly adjust an attenuation coefficient of the fast variable current attenuator based on the first gain value, and attenuate the current signal based on an adjusted attenuation coefficient.

In an optional implementation of the fifth amplification unit, the fifth amplification unit may include a current linear amplifier.

Figure 10:
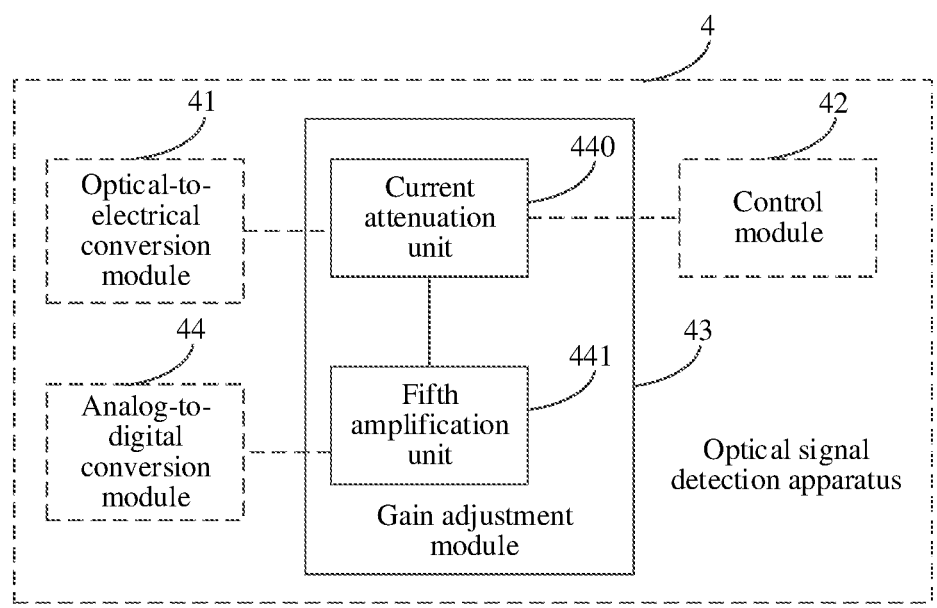
FIG. 10 is a schematic diagram of a structure of another gain adjustment module according to an embodiment.

For example, FIG. 10 is a schematic diagram of a structure of another gain adjustment module according to an embodiment. As shown in FIG. 9, the current attenuation unit 440 may be connected to the control module 42, and is configured to receive a first gain value obtained by the control module 42, or receive indication information of the first gain value obtained by the control module 42. The current attenuation unit 440 may be configured to attenuate the current signal converted by the optical-to-electrical conversion module 41 based on the first gain value. The fifth amplification unit 441 is connected to the current attenuation unit 440, and is configured to perform linear amplification on the current signal attenuated by the current attenuation unit 440. An amplified voltage signal is in the sampling range of the analog-to-digital conversion module 44, and may be transmitted to the analog-to-digital conversion module 44 for sampling.

It should be understood that in the six alternative implementations, the gain adjustment module 43 may adjust an amplitude of the electrical signal under control of the first gain value. Optionally, the gain adjustment module 43 may adjust the amplitude of the electrical signal under joint control of the first gain value and the second gain value. The second gain value and the first gain value may be respectively used for controlling different components in the gain adjustment module 43 to adjust the amplitude of the electrical signal, so that the electrical signal finally transmitted to the analog-to-digital conversion module 44 is in the sampling range of the analog-to-digital conversion module 44.

For example, in the gain adjustment module shown in FIG. 6, the voltage attenuation unit 432 is configured to attenuate the voltage signal converted by the first voltage conversion unit 431 under control of the first gain value, and the first voltage conversion unit 431 may be configured to adjust an operating resistance of the first voltage conversion unit 431 under control of the second gain value, convert the current signal converted by the optical-to-electrical conversion module 41 into a voltage signal through an adjusted operating resistance, and transmit a converted voltage signal to the voltage attenuation unit 432. The voltage signal attenuated by the voltage attenuation unit 432 is transmitted to the first amplification unit 433, and the voltage signal amplified by the first amplification unit 433 is in the sampling range of the analog-to-digital conversion module 44. The first voltage conversion unit 431 may be connected to the control module 42 (a connection relationship is not shown in the figure), and is configured to receive the second gain value sent by the control module 42, or receive indication information of the second gain value sent by the control module 42. The first gain value may be a gain value corresponding to a first detection time period obtained by the control module 42 based on a correspondence between a detection time period and a gain value that is set for the voltage attenuation unit 432. The second gain value may be a gain value corresponding to the first detection time period obtained by the control module 42 from a correspondence between a detection time period and a gain value that is set for the first voltage conversion unit 431.

For another example, in the gain adjustment module shown in FIG. 8, the third voltage conversion unit 437 is configured to convert the current signal converted by the optical-to-electrical conversion module 41 into a voltage signal under control of the first gain value. The second amplification unit 438 may be configured to adjust an amplification coefficient of the second amplification unit 438 under control of the second gain value, and perform linear amplification on the voltage signal converted by the third voltage conversion unit 437 based on an adjusted amplification coefficient, and an amplified voltage signal is in the sampling range of the analog-to-digital conversion module 44. The second amplification unit 438 may be connected to the control module 42 (a connection relationship is not shown in the figure) and is configured to receive the second gain value sent by the control module 42 or receive indication information of the second gain value sent by the control module 42. The first gain value may be a gain value corresponding to a first detection time period obtained by the control module 42 based on a correspondence between a detection time period and a gain value that is set for the third voltage conversion unit 437, and the second gain value may be a gain value corresponding to the first detection time period obtained by the control module 42 from a correspondence between a detection time period and a gain value that is set for the second amplification unit 438.

It should be understood that in the two manners, for the two modules in the gain adjustment module, amplitude adjustment of the electrical signal is flexibly controlled through the first gain value and the second gain value respectively. In some other implementations, for more than two modules in the gain adjustment module, amplitude adjustment of the electrical signal may be jointly controlled through different gain values respectively. Details are not repeated herein again.

By introducing the six alternative implementations, it is not difficult to understand that when the gain adjustment module performs gain switching between different detection time periods in a shorter time, that is, the gain switching is faster, the gain adjustment module 43 may be switched to an amplitude adjustment capability that matches the current optical signal in time, thereby achieving a better measurement effect. Optionally, a gain switching time of the gain adjustment module 43 may be controlled to be between 0.1 ns and 100 ns.

Related descriptions of the six alternative implementations are merely example descriptions of the gain adjustment module 43. The gain adjustment module 43 may further have another implementation of adjusting the electrical signal based on the first gain value, which is not limited herein. For example, the electrical signal converted by the optical-to-electrical conversion module 41 is a voltage signal, the gain adjustment module 43 includes a linear amplification module, and the linear amplification module may be configured to perform linear amplification on the voltage signal converted by the optical-to-electrical conversion module 41 based on the first gain value. An amplified voltage signal is in the sampling range of the analog-to-digital conversion module 44 and may be transmitted to the analog-to-digital conversion module 44 for sampling, or the like, which is not exhaustive herein.

Figure 11:
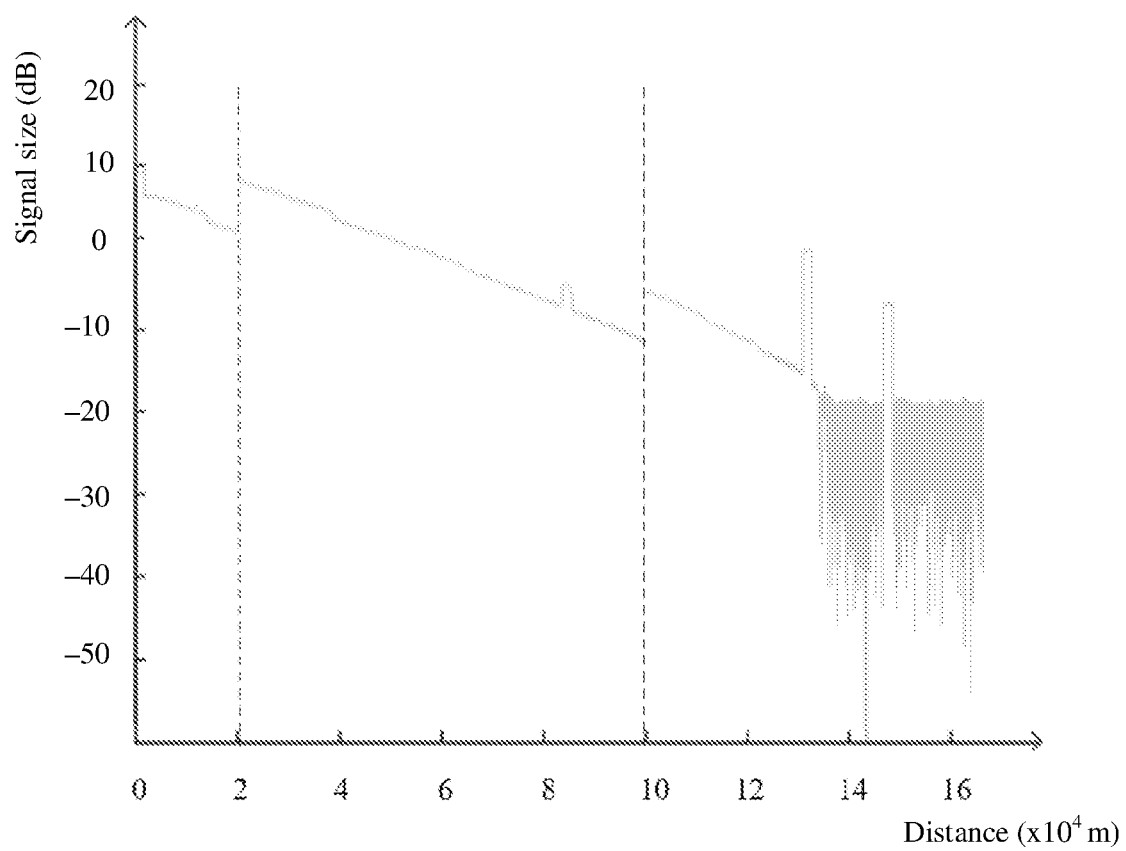
FIG. 11 is a schematic diagram of still another test result of an OTDR according to an embodiment.

The gain adjustment module 43 adjusts the amplitude of the electrical signal under control of different gain values in different detection time periods, so that the electrical signal in each detection time period may be adjusted to the sampling range of the analog-to-digital conversion module 44, thereby ensuring integrity of sampling the electrical signal. With reference to FIG. 3 and FIG. 11, descriptions are made by comparing detection results of the optical signal detection apparatus 4 in the solution and the optical signal detection apparatus with a fixed gain.

As shown in FIG. 3, if the optical signal detection apparatus with the fixed gain is used, in a finally obtained curve, a near-end electrical signal is represented as a horizontal straight line, and a distal-end electrical signal is prematurely represented as an invalid sawtooth-shaped curve segment that frequently and abruptly changes. If an optical signal detection apparatus 4 with a variable gain in different detection time periods is used, a detection cycle is divided into three detection time periods. For details, refer to FIG. 11. FIG. 11 is a schematic diagram of still another test result of an OTDR according to an embodiment. The three detection time periods are respectively a time period 1 for receiving an optical signal returned from a distance ranging from 0 km to 20 km, a time period 2 for receiving an optical signal returned from a distance ranging from 20 km to 100 km, and a time period 3 for receiving an optical signal returned from a distance after 100 km.

As shown in FIG. 11, for an electrical signal converted from the optical signal returned from the distance ranging from 0 km to 20 km, a gain value 1 may be used for performing amplification on the electrical signal, so that a signal at a near end in FIG. 3 originally represented as a horizontal line decreases to the sampling range of the analog-to-digital conversion module 44, and the analog-to-digital conversion module 44 performs sampling to obtain a curve segment (as shown by a dashed line segment between 0 km and 20 km in FIG. 11) represented as a whole as decreasing as a distance increases. For an electrical signal converted from the optical signal returned from the distance ranging from 20 km to 100 km, a gain value 2 may be used for performing amplification on the electrical signal. For an electrical signal converted from the optical signal returned from the distance ranging from 20 km to 100 km, the gain value 2 may be used for performing amplification on the electrical signal. An amplified electrical signal is in the sampling range of the analog-to-digital conversion module 44, and the analog-to-digital conversion module 44 performs sampling to obtain a curve segment (for example, a curve segment between 20 km and 100 km in FIG. 11) represented as a whole as decreasing as the distance increases. For an electrical signal converted from the optical signal returned after the distance of 100 km, a gain value 3 may be used for performing amplification on the electrical signal, so that a sawtooth-shaped signal that frequently and abruptly changes and that is prematurely represented as invalid at a distal end in FIG. 3 increases to the sampling range of the analog-to-digital conversion module, and the analog-to-digital conversion module 44 performs sampling to obtain a curve segment (a dashed line segment after 100 km in FIG. 11) represented as a whole as decreasing as the distance increases. The gain value 1, the gain value 2, and the gain value 3 are different from each other.

It should be noted that because a measurement range received by the OTDR may be greater than an actual length of the measured optical fiber (for example, a measurement range of the OTDR is between 1.5 times and 2 times the actual length of the measured optical fiber), there may still be a sawtooth-shaped curve segment that frequently and abruptly changes in the curve segment after 100 km in FIG. 11, and the sawtooth-shaped curve segment is used for representing an invalid signal detected by the optical signal detection apparatus 4 in a time after the optical signal is returned from the actual most distal end of the measured optical fiber.

It is not difficult to understand that the optical signal detection apparatus 4 performs amplification on the electrical signal by using different gain values in different detection time periods in the detection cycle, which may lead to a fact that curves corresponding to different detection time periods are discontinuous in a curve in which a strength of an optical signal changes with the distance. That is, a breakpoint occurs at an initial moment or a last moment of the detection time period. For example, in the curve shown in FIG. 11, a detection cycle is divided into three detection time periods, and the curve in FIG. 11 includes a breakpoint at a distance of 20 km and a breakpoint at a distance of 100 km. Therefore, optionally, the control module 42 may further be configured to perform, based on the first compensation value, digital compensation on a digital signal obtained by the analog-to-digital conversion module 44 through sampling. Optionally, different detection time periods in the detection cycle correspond to different compensation values. The first compensation value may be a compensation value corresponding to the first detection time period, and an actual signal change rule in the first detection time period is restored through digital compensation. A method for determining the first compensation value may be described below.

In an alternative method for determining the first compensation value, the first compensation value may be determined based on the first gain value. If amplitude adjustment is performed on the signal in the optical signal detection apparatus 4 only under control of the first gain value in the first detection time period, the first compensation value may be equal to an absolute value of the first gain value when the first compensation value and the first gain value are in a same unit, or the first compensation value and the first gain value are in a same representation form (for example, the first compensation value and the first gain value are both in a unit of dB, or the first compensation value and the first gain value are both in a representation form of a multiple). For example, if a unit of the first gain value is dB, the first gain value is a negative number, and the electrical signal is attenuated under control of the first gain value, the first compensation value is an opposite number of the first gain value. When the control module 42 is configured to perform digital compensation, an amplitude of the digital signal obtained by analog-to-digital conversion may be added to the first compensation value, to amplify attenuated amplitude compensation originally controlled by the first gain value. If the unit of the first gain value is dB, and the first gain value is a positive number, it represents that the electrical signal is amplified under the control of the first gain value, the first compensation value is the opposite number of the first gain value, and the control module 42 is configured to add the amplitude of the digital signal obtained by analog-to-digital conversion and the first compensation value during digital compensation, to attenuate the amplified amplitude compensation originally controlled by the first gain value.

In another alternative method for determining the first compensation value, if amplitude adjustment is performed on a signal in the optical signal detection apparatus 4 only under the control of the first gain value in the first detection time period, when the unit of the first gain value is dB, the first compensation value may be a difference obtained by subtracting the first gain value from a preset value, and if the first gain value is in a form of a multiple, the first compensation value may be a quotient obtained by dividing the preset value by the first gain value. Optionally, the preset value may be a maximum gain value in gain values corresponding to all detection time periods in the detection cycle.

In still another alternative method for determining the first compensation value, an overall gain of the optical signal detection apparatus 4 in the first detection time period is obtained, an overall gain of the optical signal detection apparatus 4 in another detection time period of the detection cycle is obtained, and the first compensation value is determined based on a maximum overall gain in an overall gain corresponding to each detection time period and the overall gain in the first detection time period. For example, if both the first compensation value and the maximum overall gain are in a unit of dB, the first compensation value is a difference between the maximum overall gain and the overall gain in the first detection time period. If the first compensation value and the maximum overall gain are in a form of a multiple, the first compensation value is a ratio of the maximum overall gain to the overall gain in the first detection time period. The overall gain of the optical signal detection apparatus in the detection time period may be determined based on an adjustment gain of each component (module or unit) in the optical signal detection apparatus 4 for the optical signal or the electrical signal converted from the optical signal; or may be obtained based on a configuration parameter of the optical signal detection apparatus 4, and the configuration parameter may include an overall gain of the optical signal detection apparatus 4 in each detection time period.

For example, in the optical signal detection apparatus 4 shown in FIG. 5, in the first detection time period, the gain value of the optical-to-electrical conversion module 41 is denoted as $G_{APD}$, the gain value of the first voltage conversion unit 431 is denoted as $G_{TIA}$, the gain value of the voltage attenuation unit 432 is denoted as $G_{VEA}$ (that is, equal to the first gain value, the first gain value is a negative number, and the smaller the first gain value represents more attenuation on the voltage signal), the gain value of the first amplification unit 433 is denoted as $G_{LNA}$, and the gain values are in a unit of dB. Therefore, in the first detection time period, the overall gain $G_1$ of the optical signal detection apparatus 4 is: $G_1 = G_{APD} + G_{TIA} + G_{VEA} + G_{LNA}$. In the same manner, the overall gain $G_n$ of the optical-to-electrical conversion module 41 in other detection time periods may be calculated, a maximum value $G_{max}$ of $G_1$ and $G_n$ is determined, and a difference obtained by subtracting $G_1$ from $G_{max}$ is determined as the first compensation value. It should be understood that the gain value of the voltage attenuation unit 432 in FIG. 5 changes with the detection time period. Optionally, gain values of one or more of the optical-to-electrical conversion module 41, the first voltage conversion unit 431, and the first amplification unit 433 may also be set to different gain values based on the detection time period. In the method for determining the first compensation value, the maximum overall gain of the optical signal detection apparatus 4 may be used as a reference to restore a digital signal in each detection time period, and the restored digital signal may reflect an actual signal change rule in the detection cycle.

It should be understood that the control apparatus of the OTDR is configured to perform digital signal processing on the digital signal output by the optical signal detection apparatus 4, and the control module 42 may be configured to perform digital compensation before the digital signal processing, or may perform compensation after the digital signal processing. For example, the control module 42 may be configured to calculate a relative value between the digital signal output by the optical signal detection apparatus 4 and a signal strength corresponding to an initial moment of the detection cycle. In an alternative manner, the control module 42 may be configured to perform digital compensation on the digital signal based on the first compensation value before calculating the relative value. In another alternative manner, the control module 42 may be configured to perform digital compensation on the digital signal based on the first compensation value after calculating the relative value.

Figure 12:
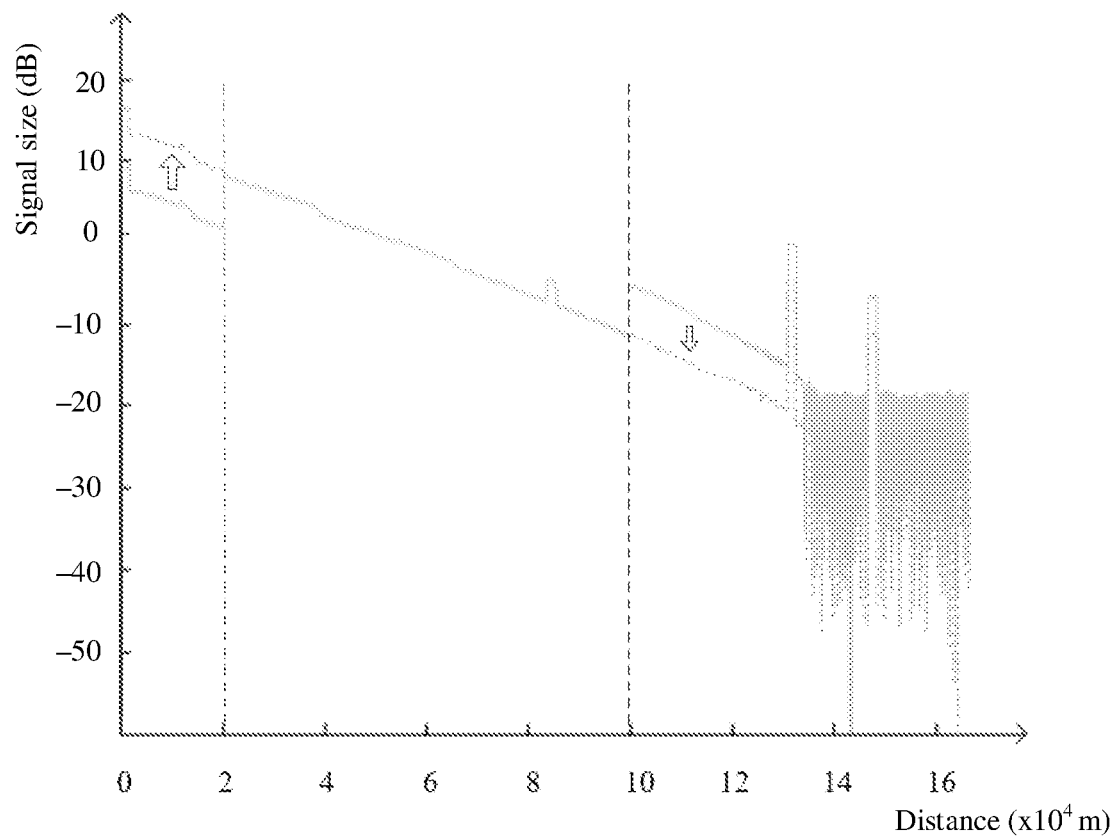
FIG. 12 is a schematic diagram of digital compensation for a measurement result of an OTDR according to an embodiment.
Figure 13:
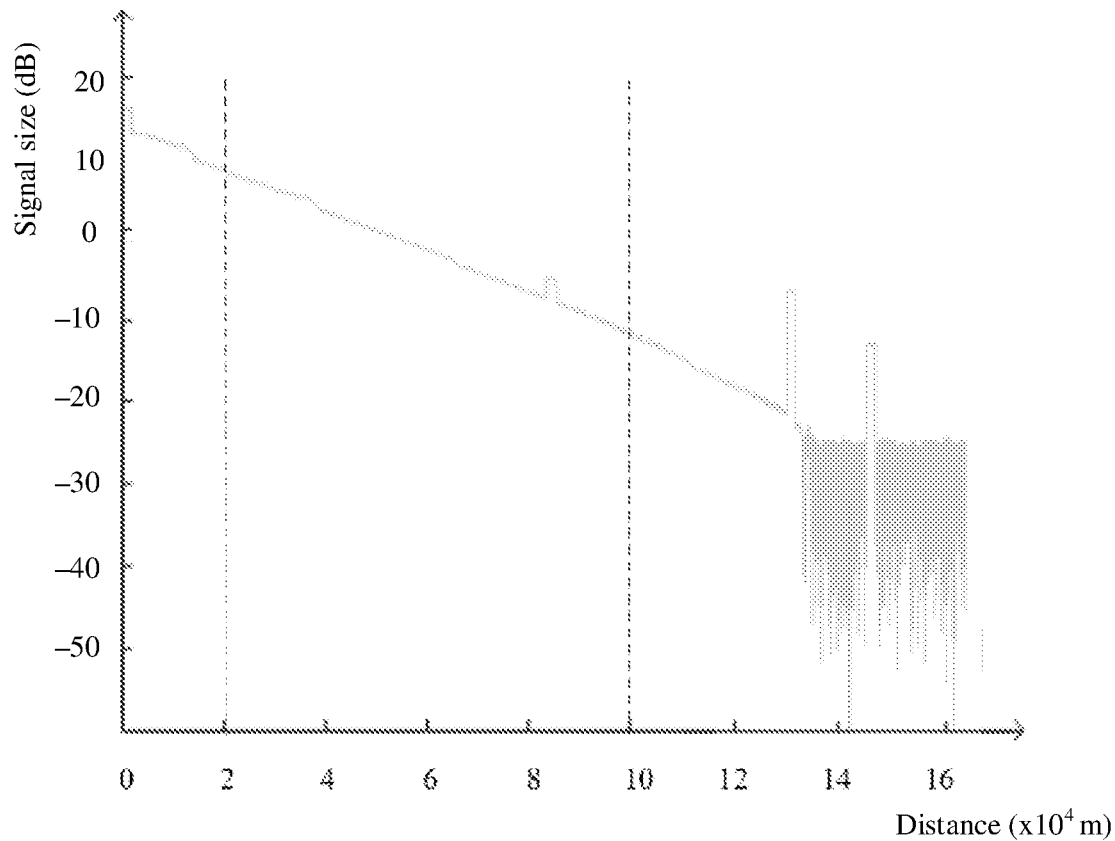
FIG. 13 is a schematic diagram of still another detection result of an OTDR according to an embodiment.

A compensation result of digital compensation is described below by using FIG. 12 and FIG. 13 as an example. FIG. 12 is a schematic diagram of digital compensation for a measurement result of an OTDR according to an embodiment. FIG. 12 shows a process of performing digital compensation for an example corresponding to FIG. 10. It is assumed that a gain value 1 corresponding to a time period 1 is a negative value, a gain value corresponding to a time period 2 is 0, and a gain value corresponding to a time period 3 is a positive value. It is assumed that both a gain value and a compensation value in the example are in a unit of dB, a compensation value 1 is determined based on a gain value 1, a compensation value 2 is determined based on a gain value 2, and a compensation value 3 is determined based on a gain value 3. In addition, the compensation value 1 and the gain value 1 are opposite numbers, the compensation value 2 and the gain value 2 are both 0, and the compensation value 3 and the gain value 3 are opposite numbers. A solid line in the coordinate system in FIG. 12 represents the curve in FIG. 11. A solid line segment before 20 km is obtained by processing after being sampled by the analog-to-digital conversion module 44 after the electrical signal is attenuated under control of the gain value 1. Because the gain value 2 is 0, a solid line segment between 20 km and 100 km is obtained by processing after being sampled by the analog-to-digital conversion module 44 after the electrical signal is not amplified or attenuated under control of the gain value 2. Because the gain value 3 is a positive number, a solid line segment after 100 km is obtained by processing after being sampled by the analog-to-digital conversion module 44 after the electrical signal is amplified under control of the gain value 3.

The control module 42 may perform digital compensation on a digital signal in the time period 1 through the compensation value 1, where the compensation value 1 is a positive value and is equal to an absolute value of the gain value 1. Therefore, through compensation of the compensation value 1, a solid line segment before 20 km may be translated upward to a dashed line segment shown before 20 km. Both the gain value 2 and the compensation value 2 that correspond to the time period 2 are 0. Therefore, a location of the solid line segment between 20 km and 100 km remains unchanged. The control module 42 may further perform digital compensation on a digital signal in the time period 3 through the compensation value 3, where the compensation value is a negative value and is equal to an absolute value of the gain value 3. Therefore, through compensation of the compensation value 3, the solid line segment after 100 km may be translated downward to a dashed line segment after 100 km. The compensation value 1 cancels an attenuation effect of the gain value 1 on the electrical signal, the compensation value 3 cancels an amplification effect of the gain value 3 on the electrical signal, and both the gain value 2 and the compensation value 2 are 0. Therefore, after translating, as shown by solid lines in FIG. 11, three curve segments after translating may become continuous curves (a gray curve in the coordinate system in FIG. 11 represents that a solid line segment and a dashed line segment between 20 km and 100 km overlap), which are used for representing a curve obtained by the optical signal detection apparatus 4 that processes, by using a same gain, electrical signals converted from optical signals received in each detection time period in the detection cycle of the optical signal. For a clearer view, refer to FIG. 13. FIG. 13 is a schematic diagram of still another detection result of an OTDR according to an embodiment. FIG. 13 shows a curve represented by a digital signal obtained after digital compensation is performed on the digital signal shown in FIG. 11.

Before the analog-to-digital conversion module 44 performs sampling, different gain values are used for adjusting amplitudes of electrical signals in different detection time periods, so that it may be ensured that all electrical signals sampled by the analog-to-digital conversion module 44 are in a sampling range. After the analog-to-digital conversion module 44 performs sampling, to ensure accuracy of digital signals, through digital compensation of the control module 42, the electrical signals adjusted by using different gain values in each detection time period may be restored to electrical signals adjusted by using a unified gain value, thereby ensuring continuity of a curve in which a strength of an optical signal changes with a distance. In this way, accuracy and readability of the curve information is improved.

It should be understood that a connection relationship in the description may be a direct connection relationship, or may be an indirect connection relationship of one or more components. In addition, the functional modules or units may be independently deployed, or some functional modules or units may be integrated together. Optionally, the modules or functions may be partially or completely integrated into a chip.

Figure 14:
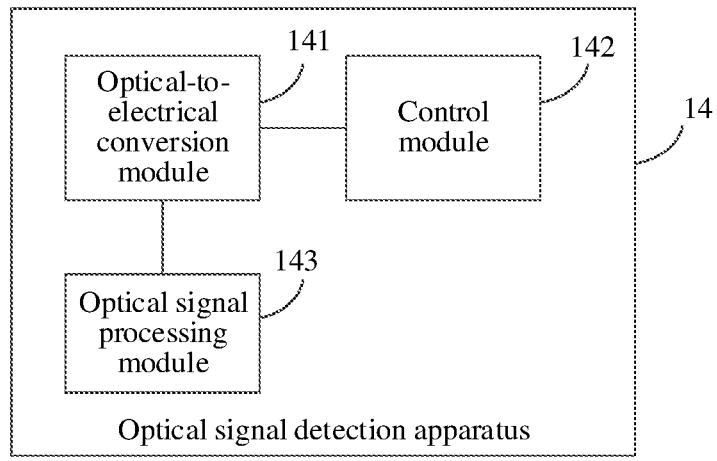
FIG. 14 is a schematic diagram of a structure of another optical signal detection apparatus according to an embodiment.

FIG. 14 is a schematic diagram of a structure of another optical signal detection apparatus according to an embodiment. As shown in FIG. 14, the optical signal detection apparatus 14 may include an optical-to-electrical conversion module 141, a control module 142, and an electrical signal processing module 143.

The optical-to-electrical conversion module 141 is configured to receive an optical signal. The control module 142 is configured to obtain a first gain value corresponding to a first detection time period. The first detection time period is a detection time period in a detection cycle, different detection time periods in the detection cycle correspond to different gain values, and the first gain value is used for controlling the optical-to-electrical conversion module 141 to adjust a strength of a received optical signal. The optical-to-electrical conversion module 141 is further configured to convert an adjusted optical signal into an electrical signal. The electrical signal processing module 143 is configured to perform sampling on a converted electrical signal, where the electrical signal converted by the optical-to-electrical conversion module 141 is in a sampling range of the electrical signal processing module; or the electrical signal processing module 143 is configured to perform amplification on the converted electrical signal, and perform sampling on an amplified electrical signal, where the electrical signal amplified by the electrical signal processing module 143 is in the sampling range of the electrical signal processing module 143.

Optionally, the optical signal detection apparatus 14 may further include a filtering module and/or a timing module (not shown in FIG. 14).

Optionally, the control module 142 may be configured to perform, based on a first compensation value, digital compensation on a digital signal obtained by the analog-todigital conversion module 144 through sampling, where the first compensation value is determined based on the first gain value.

For a division manner of the detection time period in the detection cycle of the optical signal, a form and a determining manner of a gain value corresponding to each detection time period, a function implementation of the control module 142, the filtering module, and the timing module, an indication manner of the first gain value, and a digital compensation manner of the digital signal, refer to corresponding descriptions in embodiments in FIG. 4 to FIG. 13, and details are not repeated herein again.

In an implementation of the optical-to-electrical conversion module 141, the optical-to-electrical conversion module 141 may include an optical amplification unit with a variable gain, and the optical amplification unit may be configured to adjust a strength of a received optical signal based on the first gain value.

Further, the optical amplification unit may include a variable optical amplifier. The variable optical amplifier may adjust an amplification coefficient of the variable optical amplifier based on the first gain value and perform amplification on the received optical signal based on an adjusted amplification coefficient.

Further, the optical amplification unit may be implemented by at least two optical amplifiers that have fixed amplification capabilities for the optical signal and have different amplification capabilities for the optical signal, and an optical switch that controls whether the optical amplifier operates, and controls an optical amplifier corresponding to the first gain value to be turned on through the optical switch and performs amplification on the optical signal.

In still another implementation of the optical-to-electrical conversion module 141, the optical-to-electrical conversion module 141 may include an optical attenuation unit with a variable gain, and the optical attenuation unit may be configured to adjust a strength of a received optical signal based on the first gain value.

Further, the optical attenuation unit may include a variable optical attenuator. The variable optical attenuator may adjust an attenuation coefficient of the variable optical attenuator based on the first gain value and attenuate the received optical signal based on an adjusted attenuation coefficient.

Further, the optical attenuation unit may be implemented by at least two optical attenuators that have fixed attenuation capabilities for the optical signal and have different attenuation capabilities for the optical signal, and an optical switch that controls whether the optical attenuator operates, and controls an optical attenuator corresponding to the first gain value to be turned on through the optical switch and attenuates the optical signal.

In an implementation of the electrical signal processing module 143, the electrical signal processing module 143 may include an analog-to-digital conversion unit, and an electrical signal converted by the optical-to-electrical conversion module 141 is in a sampling range of the analog-to-digital conversion unit.

In still another implementation of the electrical signal processing module 143, the electrical signal processing module 143 includes an analog-to-digital conversion unit and an electrical signal amplification unit. The electrical signal amplification unit may be configured to perform amplification on an electrical signal converted by the optical-to-electrical conversion module, and an amplified electrical signal is in a sampling range of the analog-to-digital conversion module. The electrical signal amplification unit may include one or more of electrical signal amplification components such as a trans-impedance amplifier and a linear amplifier, which is not limited.

In embodiments, the detection cycle of the optical signal includes at least two different detection time periods, and different detection time periods correspond to different gain values. An optical signal returned from a near end of a measured optical fiber and an optical signal returned from a distal end of the measured optical fiber may be received in different detection time periods. The optical-to-electrical conversion module may be configured to adjust an optical signal strength by using different gain values for optical signals received in different detection time periods, so that the electrical signal converted from the adjusted optical signal, when transmitted to the analog-to-digital conversion module, is in the sampling range of the analog-to-digital conversion module, thereby ensuring integrity of signal sampling, and improving measurement accuracy of an OTDR and an actual dynamic range of the OTDR.

Figure 15:
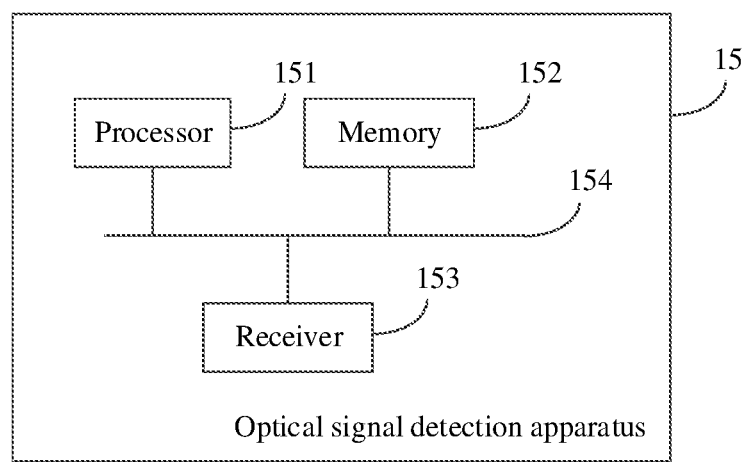
FIG. 15 is a schematic diagram of a structure of another optical signal detection apparatus according to an embodiment.

The optical signal detection apparatus in any one of embodiments shown in FIG. 4 to FIG. 10, or the optical signal detection apparatus in FIG. 14 may be implemented by the optical signal detection apparatus 15 shown in FIG. 15. As shown in FIG. 15, FIG. 15 is a schematic diagram of a structure of another optical signal detection apparatus according to an embodiment. The optical signal detection apparatus 15 shown in FIG. 15 includes: a processor 151, a memory 152, and a receiver 153. These components may be connected through a bus 154 or in another manner. In FIG. 15, an example in which the components are connected through the bus is used.

The processor 151 may be a general purpose processor, for example, a central processing unit, a digital signal processor, an application-specific integrated circuit, or one or more integrated circuits configured to implement embodiments. The processor 151 may be configured to read and execute computer-readable instructions. The processor 151 may be configured to invoke a program stored in the memory 152, for example, an implementation program in the optical signal detection method and execute instructions included in the program to implement a corresponding method. For example, the processor 151 is configured to obtain a first gain value corresponding to a first time period, or perform digital signal processing on a digital signal obtained by analog-to-digital conversion, or the like.

The memory 152 may be coupled to the processor 151 through the bus 154, or the memory 152 may be integrated with the processor 151. The memory 152 is configured to store various software programs and/or a plurality of groups of instructions. The memory 152 may include a high-speed random access memory, and may also include a non-volatile memory, for example, one or more disk storage devices, a flash storage device, or another non-volatile solid-state storage device. The memory 152 is configured to store data, for example, store a gain value corresponding to each detection time period.

The receiver 153 is configured to receive a signal, for example, receive an optical signal returned from a measured optical signal.

Components included in the optical signal detection apparatus in FIG. 15 may implement functions of modules or units in the optical signal detection apparatus in any one of embodiments shown in FIG. 4 to FIG. 10, or functions of the modules or units in the optical signal detection apparatus in FIG. 14. For an implementation and a corresponding beneficial effect, refer to detailed descriptions of embodiments corresponding to FIG. 4 to FIG. 10 or FIG. 14. Details are not repeated herein again.

The embodiments may further provide an optical signal detection method, for processing an optical signal detected in a detection cycle of an optical signal. The method may be applied to an optical signal detection apparatus, and the optical signal detection apparatus may include an optical-to-electrical conversion module, an analog-to-digital conversion module, a gain adjustment module, and a control module. The optical-to-electrical conversion module is configured to receive an optical signal and convert a received optical signal into an electrical signal. The method may include:

The control module obtains a first gain value corresponding to a first detection time period, where the first detection time period is a detection time period in the detection cycle, different detection time periods in the detection cycle correspond to different gain values, the first gain value is used for controlling the gain adjustment module to adjust an amplitude of the electrical signal, an adjusted electrical signal is used by the analog-to-digital conversion module for sampling, and the adjusted electrical signal is in a sampling range of the analog-to-digital conversion module.

Optionally, the method may further include: the control module performs, based on a first compensation value, digital compensation on a digital signal obtained by the analog-to-digital conversion module through sampling, where the first compensation value is determined based on the first gain value.

Optionally, the gain value corresponding to the detection time period is determined based on one or two of a maximum value and a minimum value of strengths of optical signals received in the detection time period and the sampling range of the analog-to-digital conversion module.

The optical signal detection method may be applied to the optical signal detection apparatus shown in any one of embodiments shown FIG. 4 to FIG. 10. For an implementation and beneficial effects of the optical signal detection method in the optical signal detection apparatus, refer to detailed descriptions of embodiments corresponding to FIG. 4 to FIG. 13. Details are not repeated herein again.

The embodiments may provide another optical signal detection method, for processing an optical signal detected in a detection cycle of an optical signal. The method may be applied to an optical signal detection apparatus, and the optical signal detection apparatus may include an optical-to-electrical conversion module, a control module, and an electrical signal processing module. The optical-to-electrical conversion module is configured to receive an optical signal. The method may include:

The control module obtains a first gain value corresponding to a first detection time period, the first detection time period is a detection time period in a detection cycle, different detection time periods in the detection cycle correspond to different gain values, and the first gain value is used for controlling the optical-to-electrical conversion module to adjust a strength of a received optical signal; and the optical-to-electrical conversion module is configured to convert an adjusted optical signal into an electrical signal, a converted electrical signal is in a sampling range of the electrical signal processing module, and is used for sampling by the electrical signal processing module, or an adjusted electrical signal is amplified by the electrical signal processing module, and the amplified electrical signal is in the sampling range of the electrical signal processing module, and is used for sampling by the electrical signal processing module.

The optical signal detection method may be applied to the optical signal detection apparatus shown in any one of embodiments corresponding to FIG. 14. For an implementation and beneficial effects of the optical signal detection method in the optical signal detection apparatus, refer to detailed descriptions of an embodiment corresponding to FIG. 14, and details are not repeated herein again.

The embodiments may further provide an optical fiber measurement device, including an optical signal detection apparatus, an emitting apparatus, a transmission apparatus, and a control apparatus. Optionally, the optical signal detection apparatus may further include a display apparatus.

The optical signal detection apparatus may be the optical signal detection apparatus in any one of embodiments shown in FIG. 4 to FIG. 10, or the optical signal detection apparatus in FIG. 14. For function implementation of the emitting apparatus, the transmission apparatus, the control apparatus, and the display apparatus, refer to corresponding descriptions of the control apparatus 10, the emitting apparatus 20, the transmission apparatus 30, and the display apparatus 50 respectively in the embodiment corresponding to FIG. 1. Details are not repeated herein again, and only with reference to an optical fiber measurement device including the optical signal detection apparatus in FIG. 5 or FIG. 7, a detection process of the optical detection device is described by using examples.

With reference to FIG. 5, a detection parameter of the optical signal detection apparatus is first described. It is assumed that in the optical signal detection apparatus shown in FIG. 5, only a voltage attenuation unit 432 is a component with a variable gain, and other components (including modules and units) are all components with fixed gains. In addition, it is assumed that a measurement range is 170 km, and a transmission speed of the optical signal in the measured optical fiber is $2 \times 10^8$ m/s, a detection cycle of the optical signal is 1.7 ms. In addition, it is assumed that in a curve of a measurement result of an OTDR with a fixed gain, a horizontal line segment is included between 0 km and 20 km, and a distance after 100 km includes a sawtooth-shaped curve segment that frequently and abruptly changes. In this case, the detection cycle may be divided into three detection time periods t1, t2, and t3, where the time period t1 ranges from 0 ms to 0.2 ms, the time period t2 ranges from 0.2 ms to 1 ms, and the time period t3 ranges from 1 ms to 1.7 ms. In addition, it is assumed that based on a gain of optical-to-electrical conversion of the optical-to-electrical conversion module 41, a gain of voltage conversion of a first voltage conversion unit 431, a gain of linear amplification of a first amplification unit 433, and a sampling range of an analog-to-digital conversion module 44, it is determined that a gain value corresponding to the voltage attenuation unit 432 in the t1 time period is −28 dB, a gain value corresponding to the t2 time period is −12 dB, and a gain value corresponding to the t3 time period is 0. Correspondingly, a compensation value corresponding to the t1 time period is 28 dB, a compensation value corresponding to the t2 time period is 12 dB, and a compensation value corresponding to the t3 time period is 0.

After the optical fiber measurement device receives a measurement instruction, the control apparatus 10 controls the emitting apparatus to emit a pulse. The optical-to-electrical conversion module 41 continuously receives an optical signal returned from the measured optical fiber in a detection cycle of the optical signal, converts the optical signal into a current signal, converts the current signal into a voltage signal through a first voltage conversion single power supply 431, and transmits the voltage signal to the voltage attenuation unit 432.

In the time period t1, the control module 42 obtains a gain value −28 dB corresponding to t1, and controls the voltage attenuation unit 432 to attenuate an amplitude of the voltage signal by 28 dB; in the time period t2, the control module 42 obtains a gain value −12 dB corresponding to t2, and controls the voltage attenuation unit 432 to attenuate the amplitude of the voltage signal by 12 dB; and in the time period t3, the control module 42 obtains a gain value 0 corresponding to t3, and controls the voltage attenuation unit 432 not to adjust the amplitude of the voltage signal.

The voltage signal output by the voltage attenuation unit 432 is amplified by the first amplification unit 433 and then transmitted to the analog-to-digital conversion module 44 for sampling. In addition, the control apparatus 10 performs digital signal processing on the digital signal sampled by the analog-to-digital conversion module 44, performs digital compensation of 28 dB on a processing result of the digital signal in the t1 time period, performs digital compensation of 12 dB on a processing result of the digital signal in the t2 time period, does not perform digital compensation on a processing result of the digital signal in the t3 time period, and after the processing results of the digital signals in the t1, t2, and t3 time periods are compensated, obtains a continuous curve of a detection result with complete information in the detection cycle.

Descriptions are made with reference to FIG. 7. It is assumed that in the optical signal detection apparatus shown in FIG. 7, only the third voltage conversion unit 437 is a component with a variable gain, and other components (including modules and units) are components with fixed gains. A detection parameter of the optical signal detection apparatus, a duration of the detection cycle, and division of the detection time period respectively correspond to information about the optical signal detection apparatus in FIG. 5. It is assumed that based on a gain of optical-to-electrical conversion of an optical-to-electrical conversion module 41, a gain of linear amplification of a second amplification unit 438, and a sampling range of an analog-to-digital conversion module 44 in FIG. 7, it is determined that a gain value corresponding to a third voltage conversion unit 437 in the t1 time period is 6 dB, a gain value corresponding to the t2 time period is 14 dB, and a gain value corresponding to the t3 time period is 20 dB. Correspondingly, a compensation value corresponding to the time period t1 is 14 dB, a compensation value corresponding to the time period t2 is 6 dB, and a compensation value corresponding to the time period t3 is 0.

After the optical fiber measurement device receives a measurement instruction, the control apparatus 10 controls the emitting apparatus to emit a pulse. The optical-to-electrical conversion module 41 continuously receives an optical signal returned from the measured optical fiber in a detection cycle of the optical signal, converts the optical signal into a current signal, and transmits the current signal to the third voltage conversion unit 437.

In the time period t1, the control module 42 obtains a gain value of 6 dB corresponding to t1, and controls the third voltage conversion unit 437 to perform voltage conversion on the received current signal based on the gain of 6 dB; in the time period t2, the control module 42 obtains a gain value of 14 dB corresponding to t2, and controls the third voltage conversion unit 437 to perform voltage conversion on the received current signal based on the gain of 14 dB; and in the time period t3, the control module 42 obtains a gain value of 20 dB corresponding to t3, and controls the third voltage conversion unit 437 to perform voltage conversion on the received current signal based on the gain of 20 dB.

The voltage signal output by the third voltage conversion unit 437 is amplified by the second amplification unit 438 and then transmitted to the analog-to-digital conversion module 44 for sampling. In addition, the control apparatus 10 performs digital signal processing on the digital signal sampled by the analog-to-digital conversion module 44, performs digital compensation of 14 dB on a processing result of the digital signal in the t1 time period, performs digital compensation of 6 dB on a processing result of the digital signal in the t2 time period, does not perform digital compensation on a processing result of the digital signal in the t3 time period, and after the processing results of the digital signals in the t1, t2, and t3 time periods are compensated, obtains a continuous curve of a detection result with complete information in the detection cycle.

The embodiments provide a non-transitory computer-readable medium, where the non-transitory computer-readable medium stores a program, and when the program runs on a computer, the computer is enabled to perform any optical signal detection method.

The embodiments may provide a chip. The chip includes a processor and a communication interface. The processor is coupled to the communication interface and is configured to implement all or some functions of the optical signal detection apparatus shown in any one of embodiments shown in FIG. 4 to FIG. 10, or implement all or some functions of the optical signal detection apparatus in FIG. 14.

In the descriptions of the embodiments, "/" means "or" unless otherwise specified. For example, A/B may represent A or B. In this embodiments, "and/or" describes only an association relationship between associated objects and represents that three relationships may exist. For example, A and/or B may represent the following three cases: only A exists, both A and B exist, and only B exists. In addition, in the descriptions, "a plurality of" means two or more.

In the embodiments and accompanying drawings, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in the various embodiments. The execution sequences of the processes should be determined according to functions and internal logic of the processes, and should not be construed as any limitation on the implementation processes of the embodiments.

What is claimed is:

1. An optical signal detection apparatus, configured to process an optical signal detected in a detection cycle of the optical signal, wherein the apparatus comprises:
    an optical-to-electrical conversion module configured to receive an optical signal and convert the optical signal into an electrical signal;
    a control module;
    a gain adjustment module; and an analog-to-digital conversion module, wherein
the control module is configured to obtain a first gain value corresponding to a first detection time period, the first detection time period is a detection time period in the detection cycle, different detection time periods in the detection cycle correspond to different gain values, and the first gain value is used for controlling the gain adjustment module to adjust an amplitude of the electrical signal; and
the analog-to-digital conversion module is configured to perform sampling on an adjusted electrical signal, wherein the adjusted electrical signal is in a sampling range of the analog-to-digital conversion module,
wherein the control module is further configured to perform, based on a first compensation value, digital compensation on a digital signal obtained by the analog-to-digital conversion module through sampling, wherein the first compensation value is determined based on the first gain value.

2. The optical signal detection apparatus according to claim 1, wherein the electrical signal converted by the optical-to-electrical conversion module is a current signal, and the gain adjustment module further comprises:
a first voltage conversion unit configured to convert the current signal into a voltage signal; and
a voltage attenuation unit
configured to attenuate, based on the first gain value, the voltage signal obtained through conversion.

3. The optical signal detection apparatus according to claim 2, wherein the gain adjustment module further comprises:
a first amplification unit configured to perform linear amplification on an attenuated voltage signal and send a linearly amplified voltage signal to the analog-to-digital conversion module.

4. The optical signal detection apparatus according to claim 1, wherein the electrical signal converted by the optical-to-electrical conversion module is a current signal, and the gain adjustment module further comprises:
a current attenuation unit configured to attenuate the current signal based on the first gain value; and
a second voltage conversion unit configured to convert an attenuated current signal into a voltage signal.

5. The optical signal detection apparatus according to claim 4, wherein the gain adjustment module further comprises:
a second amplification unit configured to perform linear amplification on the voltage signal obtained through conversion and send a linearly amplified voltage signal to the analog-to-digital conversion module.

6. The optical signal detection apparatus according to claim 1, wherein the electrical signal converted by the optical-to-electrical conversion module is a current signal, the gain adjustment module further comprises:
a third voltage conversion unit configured to convert the current signal into a voltage signal based on the first gain value.

7. The optical signal detection apparatus according to claim 1, wherein the electrical signal converted by the optical-to-electrical conversion module is a current signal, and the gain adjustment module further comprises:
a fourth voltage conversion unit configured to convert the current signal into a voltage signal; and
a third amplification unit configured to perform, based on the first gain value, linear amplification on the voltage signal obtained through conversion and send a linearly amplified voltage signal to the analog-to-digital conversion module.

8. The optical signal detection apparatus according to claim 1, wherein a gain value corresponding to the detection time period is determined based on one or two of a maximum value and a minimum value of strengths of optical signals received in the detection time period and the sampling range of the analog-to-digital conversion module.

9. An optical signal detection method for processing an optical signal detected in a detection cycle of the optical signal, wherein the method is applied to an optical signal detection apparatus, and the optical signal detection apparatus comprises an optical-to-electrical conversion module, an analog-to-digital conversion module, a gain adjustment module, and a control module; and the optical-to-electrical conversion module is configured to receive an optical signal, and convert the optical signal into an electrical signal; and
the method comprises:
obtaining, by the control module, a first gain value corresponding to a first detection time period, wherein the first detection time period is a detection time period in the detection cycle, different detection time periods in the detection cycle correspond to different gain values, the first gain value is used for controlling the gain adjustment module to adjust an amplitude of the electrical signal, an adjusted electrical signal is used by the analog-to-digital conversion module for sampling, and the adjusted electrical signal is in a sampling range of the analog-to-digital conversion module, and
performing, by the control module, based on a first compensation value, digital compensation on a digital signal obtained by the analog-to-digital conversion module through sampling, wherein the first compensation value is determined based on the first gain value.

10. The optical signal detection method according to claim 9, wherein a gain value corresponding to the detection time period is determined based on one or two of a maximum value and a minimum value of strengths of optical signals received in the detection time period and the sampling range of the analog-to-digital conversion module.

11. An optical fiber measurement device, comprising:
an optical signal detection apparatus;
an emitting apparatus;
a transmission apparatus; and
a control apparatus, wherein
the control apparatus is configured to trigger the emitting apparatus to emit an optical signal based on input configuration information;
the transmission apparatus is configured to transmit the optical signal emitted by the emitting apparatus to a measured optical fiber, and is further configured to transmit the optical signal received from the measured optical fiber to the optical signal detection apparatus;
the optical signal detection apparatus is configured to process an optical signal detected in a detection cycle of the optical signal, wherein the optical signal detection apparatus comprises an optical-to-electrical conversion module, a control module, a gain adjustment module, and an analog-to-digital conversion module, wherein
the optical-to-electrical conversion module is configured to receive an optical signal, and convert the optical signal into an electrical signal;
the control module is configured to obtain a first gain value corresponding to a first detection time period, the first detection time period is a detection time period in the detection cycle, different detection time periods in the detection cycle correspond to different gain values, and the first gain value is used for controlling the gain adjustment module to adjust an amplitude of the electrical signal; and the analog-to-digital conversion module is configured to perform sampling on an adjusted electrical signal, wherein the adjusted electrical signal is in a sampling range of the analog-to-digital conversion module; and the control apparatus is further configured to perform digital signal processing on a signal output by the optical signal detection apparatus, and output a result obtained by performing the digital signal processing, wherein the control module is further configured to perform, based on a first compensation value, digital compensation on a digital signal obtained by the analog-to-digital conversion module through sampling, wherein the first compensation value is determined based on the first gain value.

12. The optical fiber measurement device according to claim 11, wherein the electrical signal converted by the optical-to-electrical conversion module is a current signal, and the gain adjustment module further comprises:
a first voltage conversion unit configured to convert the current signal into a voltage signal; and
a voltage attenuation unit, configured to attenuate, based on the first gain value, the voltage signal obtained through conversion.

13. The optical fiber measurement device according to claim 12, wherein the gain adjustment module further comprises:
a first amplification unit configured to perform linear amplification on an attenuated voltage signal and send a linearly amplified voltage signal to the analog-to-digital conversion module.

14. The optical fiber measurement device according to claim 11, wherein the electrical signal converted by the optical-to-electrical conversion module is a current signal, and the gain adjustment module further comprises:
a current attenuation unit configured to attenuate the current signal based on the first gain value; and
a second voltage conversion unit configured to convert an attenuated current signal into a voltage signal.

15. The optical fiber measurement device according to claim 14, wherein the gain adjustment module further comprises:
a second amplification unit configured to perform linear amplification on the voltage signal obtained through conversion and send a linearly amplified voltage signal to the analog-to-digital conversion module.

16. The optical fiber measurement device according to claim 11, wherein the electrical signal converted by the optical-to-electrical conversion module is a current signal, the gain adjustment module further comprises:
a third voltage conversion unit configured to convert the current signal into a voltage signal based on the first gain value.

17. The optical fiber measurement device according to claim 11, wherein the electrical signal converted by the optical-to-electrical conversion module is a current signal, and the gain adjustment module further comprises:
a fourth voltage conversion unit configured to convert the current signal into a voltage signal; and
a third amplification unit configured to perform, based on the first gain value, linear amplification on the voltage signal obtained through conversion and send a linearly amplified voltage signal to the analog-to-digital conversion module.

* * * * *